(12) United States Patent
Lindner et al.

(10) Patent No.: US 7,648,636 B2
(45) Date of Patent: Jan. 19, 2010

(54) MIXED-MODAL ANION-EXCHANGED TYPE SEPARATION MATERIAL

(75) Inventors: Wolfgang Lindner, Klosterneuburg (AT); Michael Maemmerhofer, Vienna (AT)

(73) Assignee: Merck Patent GmbH, Darmstadt (DE)

( * ) Notice: Subject to any disclaimer, the term of this patent is extended or adjusted under 35 U.S.C. 154(b) by 212 days.

(21) Appl. No.: 11/792,092

(22) PCT Filed: Nov. 18, 2005

(86) PCT No.: PCT/EP2005/012397

§ 371 (c)(1),
(2), (4) Date: Jun. 1, 2007

(87) PCT Pub. No.: WO2006/058623

PCT Pub. Date: Jun. 8, 2006

(65) Prior Publication Data

US 2008/0164211 A1 Jul. 10, 2008

(30) Foreign Application Priority Data

Dec. 4, 2004 (EP) .................................. 04028798

(51) Int. Cl.
*B01J 41/08* (2006.01)
*B01J 41/20* (2006.01)
*B01J 41/00* (2006.01)
*B01D 15/36* (2006.01)
*B01D 15/38* (2006.01)
*B01D 15/08* (2006.01)
*B01D 15/04* (2006.01)

(52) U.S. Cl. .................... 210/656; 210/198.2; 210/263; 210/660

(58) Field of Classification Search .................. 210/635, 210/656, 660, 198.2, 263, 269
See application file for complete search history.

(56) References Cited

U.S. PATENT DOCUMENTS 5,147,536 A 9/1992 Engstroem et al.

(Continued)

FOREIGN PATENT DOCUMENTS

EP 0 032 803 A 7/1981

(Continued)

OTHER PUBLICATIONS

Peter, A., "Direct high-performance liquid chromatographic enantioseparation of apolar beta-amino acids on a quinine-derived chiral anion-exchanger stationary phase," Journal of Chromatography A, vol. 955 No. 1, Apr. 26, 2002, pp. 141-150, XP004348617.

(Continued)

*Primary Examiner*—John Kim
(74) *Attorney, Agent, or Firm*—Millen, White, Zelano, Branigan, P.C.

(57) ABSTRACT

The present invention relates to mixed-modal anion-exchange materials composed of a support on which a ligand is immobilized. The ligand combines at least one basic domain based on cyclic monobasic derivatives with two or more rings as anion-exchange domain and at least one non-ionic binding domain. The basic domain is ionized under the conditions of use and may contain secondary, tertiary, or quaternary nitrogen forming a weakly (WAX) or strongly (SAX) basic anionic exchange domains. The non-ionic binding domain allows adjustment of the overall hydrophobicity/hydrophilicity of the material and represents a second binding site for the solute to be separated. Binding to this second binding site is based on reversed phase (RP), hydrophobic interaction (HIC) or hydrophilic interaction (HILIC). Linker sites, which can be represented by a chemical bond or by hydrophobic moieties like alkyl(ene) chains or hydrophilic moieties like amide structures connect the support to the binding domains and the binding domains to each other.

8 Claims, 10 Drawing Sheets

U.S. PATENT DOCUMENTS

| | | | |
|---|---|---|---|
| 6,270,970 B1 * | 8/2001 | Smith et al. | 435/6 |
| 6,310,199 B1 * | 10/2001 | Smith et al. | 536/25.4 |
| 6,702,943 B1 | 3/2004 | Johansson et al. | |
| 6,844,355 B2 * | 1/2005 | Somberg et al. | 514/305 |
| 7,064,234 B2 * | 6/2006 | Lindner et al. | 562/14 |
| 7,125,488 B2 * | 10/2006 | Li | 210/198.2 |
| 2003/0212098 A1 * | 11/2003 | Somberg et al. | 514/305 |

FOREIGN PATENT DOCUMENTS

| | | |
|---|---|---|
| WO | WO 96/00735 A1 | 1/1996 |
| WO | WO 96/09116 A1 | 3/1996 |
| WO | WO 97/29825 A1 | 8/1997 |
| WO | WO 00/69873 A2 | 11/2000 |
| WO | WO 01/38228 A1 | 5/2001 |
| WO | WO 01/58924 A2 | 8/2001 |
| WO | WO 02/053252 A2 | 7/2002 |

OTHER PUBLICATIONS

Nogueira, R. et al., "Alternative high-performance liquid chromatographic peptide separation and purification concept using a new mixed-mode reversed-phase/weak anion exchange type stationary phase," Journal of Chromatography A, vol. 1089 No. 1-2, Sep. 30, 2005, pp. 158-169, XP004996628.

Bicker, W. et al., "Determination of chlorpyrifos metabolites in human urine by reversed-phase/weak anion exchange liquid chromatography-electrospray ionisation-tandem mass spectrometry," Journal of Chromatography B: Biomedical Sciences & Applications, vol. 822 No. 1-2, Aug. 5, 2005, pp. 160-169, XP004983025.

McLaughlin, L.W., "Mixed-mode chromatography of nucleic acids," Chemical Reviews, American Chemical Society, vol. 89, 1989, pp. 309-319, XP002152137.

Kastner, M., "Protein Liquid Chromatography," Journal of Chromatography, vol. 61, 2000.

Roos, P.H. in Kastner, M., "Protein Liquid Chromatography," Journal of Chromatography, vol. 61, 2000, p. 18, Table 1.4.

Schlueter, H. in Kastner, M., "Protein Liquid Chromatography," Journal of Chromatography, vol. 61, 2000, p. 157, Table 3.1.

Jacob, L.R. in Kastner, M., "Protein Liquid Chromatography," Journal of Chromatography, vol. 61, 2000, p. 240, Table 4.1.

Hayes and Malik, Anal. Chem., vol. 72, 2000, p. 4090.

Meyer, V.R., "Practice of high-performance liquid chromatography," Salle & Sauerlaender, 1990, appendices, summary of chemical columns.

Johansson, B.-L. et al., Journal of Chromatography A, vol. 1016, 2003, pp. 21-33.

Laemmerhofer, M. et al., Tetrahedron: Asymmetry, vol. 14, 2003, p. 2557.

Laemmerhofer, M. et al., Journal of Chromatography A, vol. 741, 1996, p. 33.

Scherer et al., Journal of Chromatography A, vol. 924, 2001, pp. 197-209.

Crowther, J. et al., Chromatographia, vol. 16, 1982, pp. 349-353.

Floyd et al., Anal. Chem., vol. 154, 1986, pp. 570-577.

Cox, G. et al., Journal of Chromatography, vol. 117, 1976, pp. 269-278.

Poole, C.F., Trends Anal. Chem., vol. 22, 2003, pp. 362-373.

Freitag et al., Journal of Chromatography A, vol. 728, 1996, p. 129.

Strege et al., Anal. Chem., vol. 72, 2000, pp. 4629-4633.

Hennion, M.-C., Journal of Chromatography A, vol. 856, 1999, pp. 3-54.

Huang et al., Anal. Chem., vol. 71, 1999, p. 1786.

Zhao, J. et al., Anal. Chem., vol. 72, pp. 4413-4419.

Burton et al., Biotechnology & Bioengineering, vol. 56, 1997, pp. 45-55.

Teichberg, Journal of Chromatography, vol. 510, 1990, p. 49.

Huber, C.G. et al., LC-GC, vol. 14, 1996, p. 114.

Issaq et al., Journal of Liquid Chromatography, vol. 11, 1988, p. 2851.

Buszewski et al., Journal of Liquid Chromatography, vol. 20, 1997, p. 2313.

Ross et al., Immunological Anatomy and Biology, vol. 102, 1987, pp. 227-231.

Jodlbauer, J. et al., Journal of Chromatography A, vol. 945, 2002, p. 45.

Mandl et al., Journal of Chromatography A, vol. 858, 1999, p. 1.

Stetter, H., Angew. Chemie, vol. 74, 1962, pp. 361-374.

Bischoff, R. et al., Journal of Chromatography, vol. 270, 1983, pp. 117-126.

Journal of Chromatography B, vol. 689, 1997, pp. 123-135.

\* cited by examiner

MIXED-MODAL ANION-EXCHANGED TYPE SEPARATION MATERIAL

TECHNICAL FIELD

The present invention relates to separation science, and in particular to the invention of new sorption and separation materials enabling the selective recognition and binding of compounds like drugs and other pharmaceuticals, toxins, metabolites of drugs and toxins, agrochemicals, synthetic peptides, biomolecules such as peptides, proteins, nucleic acids, carbohydrates, and their separation from disturbing and unwanted accompanying compounds, interferences or impurities. The materials are to be used in analytical and preparative scale separations. Preparative downstream purification processes are another primary focus of the invented materials.

BACKGROUND OF THE INVENTION AND PRIOR ART

Chemical compounds produced for the use as drug substances, agrochemicals, diagnostics, food additives, flavours, etc. are underlying stringent quality demands in terms of purity or presence of chemical and stereochemical impurities. As typical purity level, a compound with <0.1% impurity is said to be pure in pharmaceutical chemistry. For safety reasons the reporting threshold of impurities in drug substances has therefore been set to 0.05%, which means that analytical procedures adopted for the quality control need to be able to detect and quantify impurities down to this percentage or quantitation limit. Such low quantitation limits are difficult to reach and require assays with high selectivity thereby ensuring their accuracy. Chromatographic methods are often the preferred methodology to do so, in particular in conjunction with highly sensitive and selective mass spectrometric detection.

The impurities which are usually process- and drug-related organic compounds originate from manufacture or storage and may stem from starting materials, by-products of reactions, degradation products, reagents, ligands, catalysts, etc. After the synthesis the products are usually purified by common chemical means such as extraction, crystallization, distillation. However, to end up with above specified high pharmaceutical quality (purity) a final chromatographic purification step is nowadays often employed. In the majority of cases this is chromatography with chemically modified surfaces. The materials which are subject of the present invention comply with both analytical and preparative application and may be employed for basic, neutral, acidic and amphoteric compounds.

One purification problem not yet satisfactorily solved arises in particular for synthetic peptides which are of exceptionally broad use as drugs, drug transporters, diagnostics, radio-pharmaceuticals, synthetic vaccines, bioactive research compounds, building blocks, structural probes, analytical standards, and so forth. In general, the synthesis of peptides, be it by solid-phase synthesis or solution-phase chemistry strategies, provides not only the target peptide, but also impurities which may result from multiple coupling due to deprotection, failed coupling (deleted sequences), hydrolysis of protected side chains (e.g. t-butyl ester of Glu), imide formation, deamidation (e.g. of Gln, Asn side chains), racemization (yielding epimers or diastereomers), oxidation, S-S exchange, β-elimination, and so forth. After the initial standard clean-up procedures these impurities are still present. Hence, a final chromatographic purification step is demanded to end up with the required purity. Nowadays, this final chromatographic purification is normally performed by gradient elution reversed-phase liquid chromatography (RP-HPLC) with acetonitrile as organic modifier (containing 0.1% trifluoroacetic acid) using usually octadecyl-modified silica (ODS) as stationary phase. Although this method offers in principle good selectivity and high efficiency, unfortunately it often fails in particular for very hydrophilic or also very hydrophobic peptides as well as structurally closely related peptides that are often present as impurities. Such side products appear in the RP-HPLC chromatograms as accompanying minor peaks in close vicinity to the front or tailing end of the main component peak, being insufficiently resolved. If it comes to preparative separations where overloading is mandatory to achieve sufficient productivity, they tend to co-elute with the main component which is in particular critical and disturbing when the peptide has to be produced in drug quality (less than 0.1% impurity).

Similar problems and considerations are valid for synthetic oligopeptides of pharmaceutical interest that are also prepared by solid-phase synthesis.

Another major application field of chromatography has become the downstream processing of biopolymers in particular proteins for their purification. Proteins that are chromatographically purified include enzymes, hormones, receptors, transporters, plasma proteins, mono- and polyclonal antibodies, membrane proteins, recombinant proteins, and so forth. The downstream processing, e.g. from a fermentation broth, consists of several steps wherein chromatography is an accepted option even in early purification steps. For example, in the capture step and/or the cell separation expanded bed chromatography, which is a relative new method for the purification of cell broth, may be employed. The separation medium is loosely packed in the column and becomes fluidised during the run. Thus cells can flow through the column while proteins may bind to the separation material. The ionic strength of the medium has to be high enough to prevent cells from binding. Alternatively also inexpensive ion exchange media can be utilized for batch adsorption for this first purification step. The typical purification step is normally done by chromatography using modes like ion exchange, hydrophobic interaction chromatography, affinity chromatography using affinity ligands like complexed metal ions, protein A, protein G, heparin, or dyes. Instead of particulate sorbent beds the use of derivatized membranes is known as interesting alternative (M. Kastner, Ed., Protein Liquid Chromatography, Journal of Chromatography Library, Volume 61, Elsevier, Amsterdam, 2000). Besides, reversed-phase chromatography, gel chromatography, and ion-exchange are frequently employed for final purification (polishing) of protein products or for the virus and endotoxin removal. Often biocompatible conditions are required or at least preferred. This is a considerable drawback of standard RP materials and methods, which require elution conditions that may lead to denaturing. In addition, a low sample loading capacity is typical for RP chromatography like for a number of other protein chromatography modes such as hydrophobic interaction chromatography (HIC) or affinity chromatography like protein A/G as chromatographic ligand. If bioactivity needs to be maintained methods like ion-exchange or affinity chromatography need to be adopted. While the latter has a low capacity, the high sample loading capacity is one of the strengths of ion-exchange. These and other advantages and disadvantages are discussed in detail in textbooks on protein separation (e.g. in M. Kastner (Ed.), Protein Liquid Chromatography, Journal of Chromatography Library, Volume 61, Elsevier, Amsterdam, 2000).

We herein propose a concept for separation media based on various support materials modified with ligands containing both anion exchange sites and binding sites based on non-ionic interactions. The distinct binding domains are integrated in the ligand structure in a sequential combination of the respective structural elements, thus leading to a multi-modal type separation material. The anion exchange sites of the separation materials according to the present invention contain endocyclic nitrogen in cyclic systems with two or more rings as secondary, tertiary or quaternary amine groups. Examples of such ring systems are the quinuclidine or tropane system. This leads to surprising effects such as greatly enhanced selectivities and vastly improved loading capacities compared to materials that utilize the individual chemical interactive groups as surface modifications of carriers. The new separation materials are to be used for the separation and purification of compounds like drugs, drug intermediates, toxins, metabolites of drugs and toxins, fine chemicals, pharmaceuticals, synthetic peptides, biological compounds such as peptides, proteins, RNA, DNA, and carbohydrates, and many others.

As traditionally pointed out the most frequently utilized separation and purification method for drugs, pharmaceuticals and peptides is reversed-phase high-performance liquid chromatography (RP-HPLC). The separation is carried out on materials that possess hydrophobic surface areas or surface layers as formed by long alkyl chains (C8 or C18 phases) or hydrophobic polymers (polymeric RP stationary phases) (for typical examples see H. Schlüter in: M. Kastner (Ed.), Protein Liquid Chromatography, Journal of Chromatography Library, Volume 61, Elsevier, Amsterdam, 2000, p. 157, Table 3.1, or V. R. Meyer, Practice of high-performance liquid chromatography, Salle+Sauerländer, 1990, appendices, summary of commercial columns). The selectivity is based on lipophilicity differences of the solutes to be separated which translates into differential adsorption of the solutes. Some new RP phases have a hydrophilic end-capping or incorporate a hydrophilic group in the allyl strand such as an amide, carbamate or sulfonamide which are then called polar embedded RP phases. These RP phases allow their operation also with purely aqueous eluents and in some instances the polar groups provide an additional retention contribution e.g. for hydrophilic solutes. Such RP type stationary phases are available in a huge variety of variants from a large number of suppliers. They differ from the materials of the present invention by the lack of the anion-exchange site. Likewise, moderately hydrophobic separation materials carrying typically phenyl or C1 to C8 alkyl ligands as interactive moieties which are used for hydrophobic interaction chromatography (HIC) (for examples see L. R. Jacob in: M. Kastner (Ed.), Protein Liquid Chromatography, Journal of Chromatography Library, Volume 61, Elsevier, Amsterdam, 2000, p. 240, Table 4.1) do also not possess an ionic interaction site for (an)ion-exchange. The same applies also to many stationary phases for hydrophilic interaction chromatography (HILIC) that miss this positively charged interactive moiety (anion-exchange site). On the contrary, classical anion-exchange materials such as summarized by P. H. Roos in: M. Kastner (Ed.), Protein Liquid Chromatography, Journal of Chromatography Library, Volume 61, Elsevier, Amsterdam, 2000, p. 18, Table 1.4, miss the hydrophobic long alkyl chain ligand and thus the hydrophobic interaction contribution. On the other hand, conventional anion-exchangers lack also the additional hydrophilic interaction sites which are typical for HILIC materials. Moreover, it is pointed out that the classical anion-exchangers as well as HILIC suitable anion-exchangers are based on non-cyclic amines or in other words are synthesized from non-cyclic, aliphatic amines as building blocks and hence can be clearly distinguished by this criterium from the present invention.

Recently, mixed-modal chromatography which is based on at least two modes of interaction, in most cases ion-exchange and hydrophobic interaction, have become more popular, because it seems that often the achieved resolution outperforms that of corresponding separate individual single-mode chromatographic separations. Such mixed-modal chromatography can be carried out in a number of different variants, which have been reviewed by L. W. McLaughlin (1989) in Chem. Rev. 89, pages 309-319:

Category 1: On-line coupling of different columns packed with individual conventional single mode separation materials that are more or less orthogonal to each other: For example, a reversed-phase column can be on-line coupled to an ion-exchange column. Mixed-modal anion-cation exchange/hydrophilic interaction chromatography was utilized for example by Strege et al. (Anal. Chem., 2000, 72, 4629-4633). The method compares the selectivities obtained by a sequential on-line combination of distinct columns (packed with the individual sorbents viz. anion-exchanger, cation-exchanger, and HILIC material) with the selectivities afforded by the individual columns alone.

Category 2: Mixed-modal chromatography with mixed-bed columns: The blending of distinct separation materials such as ion-exchanger and reversed-phase particle in a single HPLC column leads to mixed-bed columns that may give complementary selectivity compared to columns packed with individual conventional single mode chromatographic particles. For example, blending of two types of different materials such as RP particles and anion-exchanger (e.g. strong anion-exchanger particles) in a single column has been suggested as alternative to combine different retention mechanisms, and such columns are commercially available e.g. with trade name Duet® from Hypersil.

Category 3: The distinct interactive functionalities such as ion-exchanger group and hydrophobic moiety are located on different components of the separation material, i.e. one at the dedicated chromatographic ligand and the other at the support, and thus are spatially separated. Often, the interaction site at the support that is more an undesired residual interactive group rather than a dedicated or customized functional group is not well accessible by the separands thus missing the corresponding selectivity. Such materials are usually obtained, if a support having a specific functionality or physicochemical character such as a hydrophobic nature, is derivatized with another functionality like an ionic group. In such cases, the interactions of the solute with the support are regarded as secondary interactions which are usually assessed to be detrimental and therefore avoided or at least minimized (e.g. by choice of appropriate mobile phase conditions, end-capping, coating or shielding procedures). (Alkyl)amino-modified poly(styrene-co-divinylbenzene) materials are to be classified into this category (C. G. Huber et al., LC-GC, 14, 1996, 114).

Category 4: In another variation, the two complementary interactive functionalities may be present on two distinct spatially separated chromatographic ligands, but randomly immobilized on same support particle leading to a uncontrolled spatial distribution of the two distinct ligands: Such adsorbents on silica basis could be synthesized for instance if a mixture of two different silanes each carrying one of the interactive moieties are used for the immobilization procedure. The combination of two different interaction mechanisms such as anion-exchange and hydrophobic interaction on a single chromatographic particle, but on two distinct interactive ligands (e.g. trimethylammoniumpropyl and C8 or C18 alkyl groups immobilized on silica) has previously been exploited in solid-phase extraction (C. F. Poole, Trends Anal. Chem., 2003, 22, 362-373; M.-C. Hennion, J. Chromatogr. A, 856, 1999, 3-54). Such mixed-modal SPE materials are commercially available from a number of suppliers including Waters (Oasis® MAX) and International Sorbent Technology (Isolute® HAX). Such a type of mixed-modal reversed-phase/anion-exchanger has been specifically developed for capillary electrochromatography (CEC) by copolymerization of two types of monomers one carrying the C18 alkyl group and the other carrying quaternary N-benzyl trimethylammonium groups onto the surface of vinyl-modified silica particles, wherein the ion-exchange site fulfills the function of generation of electroosmotic flow, while the hydrophobic ligand is mainly responsible for selectivity and separation (Scherer et al., J. Chromatogr., A 924,2001, 197-209).

Category 5: The last type of mixed-modal chromatographic material has the two (or more) distinct interaction sites in a single chromatographic ligand.

The present invention provides new types of mixed-modal chromatographic media that belong to the fifth category: distinct interaction sites such as anion-exchange and hydrophobic or hydrophilic moieties in single chromatographic ligand. Documents of prior art relative to the fifth category and commercial products are summarized in the following.

WO 96/09116 discloses mixed modal sorbents which comprise nitrogen containing heteroaromatic bases. Similar mixed modal sorbents are disclosed in WO 00/69872. WO 01/38228 discloses a method for anion-exchange adsorption and anion-exchangers that comprise a base matrix carrying a plurality of mixed modal anion-exchange ligands comprising a positively charged structure and a hydrophobic structure. Among a vast number of alternative ligand structures disclosed in this document some cyclic structures are also mentioned. The same holds true for the disclosure of WO 97/29825.

U.S. Pat. No. 5,147,536 discloses anion exchange materials, whereby the anionic group consists of two positively charged groups at a distance of two atoms from each other. These positively charged groups can be part of an linear structure or of cyclic structures. Among these are derivatives of 1,4-diazabicyclo[2.2.2]octane (DABCO). According to the invention disclosed in this document the spacer, which binds the anionic group to the insoluble support, is supposed not to interact with the sample molecules. Consequently, sorbents comprising derivatives of 1,4-diazabicyclo[2.2.2]octane (DABCO) are not part of the present invention.

WO 02/053252 discloses separation methods using mixed modal adsorbents of various types, some of which are comprise more than one type of ligand bonded to the support, whereby at least one of the ligands can be charged (e.g. positively charged) and is capable for ion-exchange.

Documents disclosing commercialized mixed modal sorbents of the type mentioned above or applications thereof are discussed in the following: An HPLC column (tradename BSC 17 from Cluzeau Info Labo, Saint Foy la Grande, 33220 France) is commercially available from Ehrenstorfer, which is packed with a quaternary anion-exchanger containing a hydrophobic alkyl substituent; the ligand is a 3-(N-dodecyl-N,N-dimethylammonium)-propylsilica (application of this type of material has been described by J.-P. Steghens et al. (2003) J. Chromatogr. B 798, pages 343-349). Similarly, Allsep Technologies offers columns which contain positively charged functional groups derivatized with hydrophobic alkyl groups (tradenames Primesep® B, Primesep® B2). The exact structures are not disclosed, but according to the scheme of the application guide the basic group is a non-cyclic quaternary ammonium ion. D. M. Lubman and coworkers describe the use of a mixed-modal (C18 reversed-phase/anion-exchange) stationary phase that was obtained from Alltech (Deerfield, Ill.) for CEC-mass spectrometry analysis of peptides (Anal. Chem., 71, (1999), pages 1786 ff). According to the authors, the material consists of a spherical silica substrate bonded with a single ligand containing both reversed-phase (C18) and dialkylamine in a fixed 1:1 ratio. Similarly, Hayes and Malik report on the development of silica monoliths with N-octadecyldimethyl(3-trihydroxysilyl-propyl)ammonium chloride ligand in situ incorporated in the sol-gel matrix and their evaluation for CEC (Anal.Chem., 72, (2000), pages 4090 ff.). J. Zhao et al. described a quaternized trimethylaminated polystyrene zirconia as a strong anion-exchange material for HPLC having a mixed-mode retention mechanism with anion-exchange and hydrophobic interaction as well as Lewis acid/base inter-actions (Anal. Chem. 72, (2000), pages 4413-4419). Burton et al. prepared mixed mode sepharose and Perloza bead cellulose matrices carrying hydrophobic and ionic groups obtained by attaching hydrophobic amine ligands to epichlorohydrin (Biotechnology & Bioengineering, (1997), 56, pages 45-55). B.-L. Johansson et al. reported on the synthesis and evaluation of multi-modal anion-exchange separation media with ligands based on aromatic and non-aromatic primary and secondary amines (or both), and in addition hydroxyl groups adjacent to the anion-exchanger site for the capture of proteins at high salt strength from fermentation broth (J. Chromatogr. A, 1016, (2003), pages 21-33). BioSepra® products (of Ciphergen) such as MEP HyperCel® material for hydrophobic charge induction chromatography and MBI HyperCel® material for mixed-mode chromatography combine also more than one separation mechanism on a single ligand. The MEP HyperCel® material is obtained by immobilizing 4-vinylpyridine on mercapto-alkylated chromatographic support by radical addition yielding a 4-[2-(alkylthio)-ethyl]pyridine ligand on the surface of the separation material. The pyridine group is only weakly basic ($pK_a$=4.8). The basic principle is to exploit either hydro-phobic interactions between the ligand (at high pH, pH>$pK_a$ i.e. pH>5.8) and the solute which contains both hydrophobic and positively charged groups (designed specifically for biomolecules such as proteins, in particular antibodies) or repulsive electrostatic interactions between the positively charged chromatographic ligand (at low pH, pH< or around $pK_a$ i.e. pH between 4-5.8) and the positively ionized solute. The two different types of interactions are typically exploited sequentially viz. adsorption or binding e.g. of antibodies at 'high' (around neutral) pH and desorption or elution at low pH (around $pK_a$ of pyridine). MBI HyperCel® material for mixed-mode chromatography similarly is based on an aromatic nitrogen-containing group, which in contrast to the MEP HyperCel® material however, carries in addition a strongly acidic sulfonic acid group. The ligand is 2-mercaptobenzimidazole-5-sulfonic acid bonded through the mercapto-group to epoxy-functionalized support by nucleophilic substitution. The resulting material can be classified as a mixed modal cation exchanger. Additional mixed-modal phases such as mixed-modal RP/cation-exchangers (e.g. ABx liquid chromato-graphy column which is a weak cation exchanger: this silica-based mixed-modal ion-exchange matrix was employed for the purification of monoclonal antibodies as described by Ross et al., J. Immunological Anatomy and Biology, (1987), 102, pages 227-231), or immobilized artificial membrane chromatography phases (IAM phases of C.Pidgeon), or mixed-modal zwitterionic HILIC materials (ZILIC, K. Irgum) have been disclosed in literature.

None of the above documents of prior art discloses mixed-modal sorbents with anion-exchange groups based on monobasic cyclic systems with endocyclic nitrogen and with two or more rings as secondary, tertiary or quaternary amine groups like quinuclidine and tropane, as well as their isomers or the more complex structures of Formulae Ic to If.

Quinine and its isomers and derivatives like e.g. quinidine, 10,11-dihydroquinine, or 10,11-dihydroquinidine have been used as chiral effectors (J. Chromat. A. 741 (1996) pages 33-48, and Tetrahedron Asymmetry 14 (2003) pages 2557-2565). In order to achieve good chiral separations sorbents for chiral chromatography are optimized in a way that the chiral interactions are by far the most prominent ones and that other types of non-chiral interactions (e.g. ionic or hydrophobic) are avoided as much as possible. These alkaloids are summarized as cinchona alkaloids. Sorbents comprising such cinchona alkaloids are not part of the present invention.

SUMMARY OF THE INVENTION

The present invention relates to multi-modal anion-exchange type separation materials constructed of modular interaction/binding domains in a single functional interactive ligand (representative examples see Formula I below).

(SUP)-(L)-(NI)-(L)-(AX)              (I a)

(SUP)-(L)-(AX)-(L)-(NI)              (I b)

(SUP)-(L)-(NI)-(L)-(AX)-(L)-(NI)     (I c)

(SUP)-(L)-(AX)-(L)-(NI)-(L)-(AX)     (I d)

(SUP)-(L)-(NI)-(L)-(AX)-(L)-(AX)     (I e)

(SUP)-(L)-(AX)-(L)-(AX)-(L)-(NI)     (I f)

The mixed-modal anion-exchange materials of Formula I are comprised by at least a support ((SUP); carrier, matrix) and a ligand comprising a weakly (WAX) or strongly (SAX) basic functionality (AX) being ionized under the conditions of use and thus representing an anion-exchange site, a site which is suitable for non ionic interaction (NI), and a linker (L) between these modules. The non ionic interaction site and depending on its structure together with the linker allow the adjustment of the overall hydrophobicity/hydrophilicity of the sorbent. The linker sites (L) in Formula I can have independently from each other any meaning detailed below. According to the present invention the anion-exchange site is based on structures with endocyclic nitrogen in cyclic systems with two or more rings as secondary, tertiary or quaternary amine groups, such as obtained through incorporation of e.g. a quinuclidine and tropane ring systems. Anion-exchange sites according to the present invention as well as their preferred embodiments are described below in a dedicated chapter ("The Anion Exchange Site (AX)").

The chemical and spatial arrangement (sequence) of the individual interaction domains on the interactive ligand is variable allowing modulation of the binding effect. Through the combination and the sequence of these multiple binding sites (anion-exchange plus hydrophobic and/or hydrophilic, i.e. hydrogen bonding, groups) the materials are capable for binding and separating chemical compounds by more than one mechanism of interaction and adsorption.

In particular the present invention relates to mixed-modal anion-exchange materials comprising a support and an interactive ligand moiety, whereby said interactive ligand moiety comprises a sequential combination of modular binding domains, and whereby said modular binding domains comprise at least one anion-exchange site being ionizable under the conditions of use and at least one non-ionic binding site, characterized in that said anion exchange site comprises an oligocyclic aza compound with endocyclic nitrogen with the proviso that said oligocyclic aza compound with endocyclic nitrogen is not a derivatives of 1,4-diazabicyclo[2.2.2]-octane (DABCO) nor a part of a cinchona alkaloid bound to said support. The present invention relates also to procedures to prepare the mixed-modal anion exchange materials according to the present invention and to the use of these mixed-modal anion exchange materials for the chromatographic separation of at least two solutes.

OBJECTIVES OF THE INVENTION

The objective of the present invention is to provide novel mixed modal anion exchange materials in order to improve the performance of prior art mixed modal anion exchange materials. In particular improvements relate to:

a) Improved mixed-modal anion-exchangers should enable the simultaneous separation of hydrophilic as well as hydrophobic basic, acidic, neutral and amphoteric solutes (analytes or separands) in a single process, preparative or analytical chromatographic run.

b) They should be usable for the separation and purification of compounds like drugs, drug intermediates, toxins, metabolites of drugs and toxins, pesticides, fine chemicals, intermediates, peptides, proteins, nucleotides, nucleosides, nucleic acids, carbohydrates, and mixtures of such species from related compounds or impurities.

c) They should provide complementary and/or improved selectivity for the separations of compounds mentioned in a) and b) in comparison to the parent single mode chromatography technique such as reversed-phase HPLC or anion-exchange chromatography, as well as in comparison to mixed mode sorbents of prior art.

d) Such improved materials should provide enhanced sample loading capacity arising from improved resolution and owing to the existence of ion-exchange mechanism.

e) The improved resolution and enhanced sample loading capacity should lead to a significant gain in productivity in preparative or process scale separations or purifications.

f) Mixed-modal adsorbents should be designed to be useable with purely aqueous eluents without any organic modifier or at least with lower organic modifier content as compared to typical reversed-phase separation media that are the state-of-the-art separation materials for compounds as mentioned in a) and b), and in particular of low molecular weight compounds, drugs, and peptides.

g) The mixed-modal chromatographic mechanism provides more parameters and mobile phase variables for optimization and fine tuning of the separation. This raises the chance that compound mixtures which are difficult to separate can be resolved as well as that more compound peaks can be isolated from each other.

BRIEF DESCRIPTION OF THE DRAWINGS

FIG. 8: Separation of N-acetyl-Ile-Glu-Gly-Arg-p-nitroanilide from uracil; for experimental details see Example C2 c).

FIG. 9: Separation of N-acetyl-Ile-Glu-Gly-Arg-p-nitroanilide from uracil; for experimental details see Example C2 d).

FIG. 10: Separation of N-acetyl-Ile-Glu-Gly-Arg-p-nitroanilide from its side products, (10A): major side product; (10B): N-acetyl-Ile-Glu-Gly-Arg-p-nitroanilide; for experimental details see Example C2 e).

FIG. 11: Separation of a mixture consisting of butylbenzene (BuB), pentylbenzene (PeB), O,O-diethylphosphorothioate (DETP), and N-(tert-butoxycarbonyl)-prolyl-phenylalanine (Boc-Pro-Phe); for experimental details see Example C2 f).

DETAILED DESCRIPTION OF THE INVENTION

Figure 1:
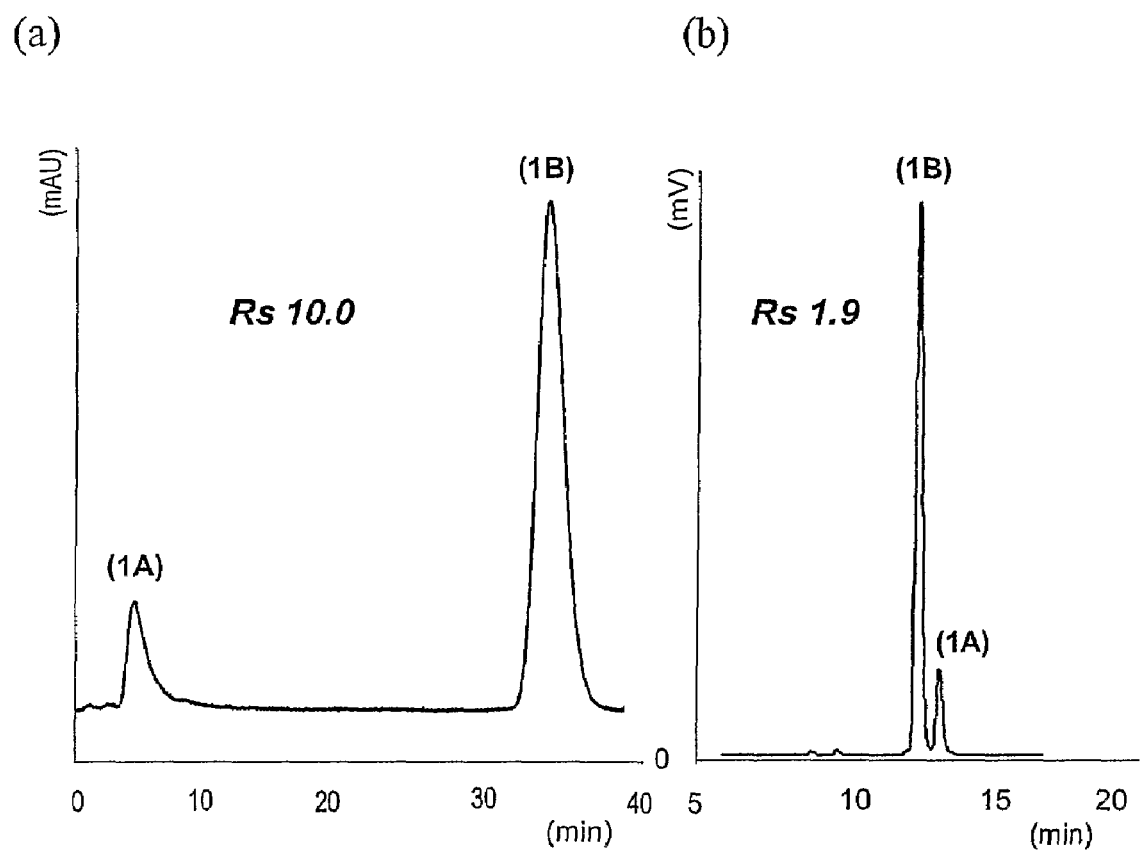
FIG. 1: HPLC separations of N-acetyl-Ile-Glu-Gly-Arg-p-nitroanilide and by-products from its synthesis on (a) N-10-undecenoyl-3-aminoquinuclidine based (example A1) and (b) commercially available RP stationary phases. For experimental details see Example B1.

The present invention relates to multi-modal anion-exchange type separation materials constructed of modular interaction/binding domains in a single functional interactive ligand (see Formula I).

(SUP)-(L)-(NI)-(L)-(AX)　　(I a)

(SUP)-(L)-(AX)-(L)-(NI)　　(I b)

(SUP)-(L)-(NI)-(L)-(AX)-(L)-(NI)　　(I c)

(SUP)-(L)-(AX)-(L)-(NI)-(L)-(AX)　　(I d)

(SUP)-(L)-(NI)-(L)-(AX)-(L)-(AX)　　(I e)

(SUP)-(L)-(AX)-(L)-(AX)-(L)-(NI)　　(I f)

The mixed-modal anion-exchange materials of Formula I comprise the following modules: at least a support ((SUP); carrier, matrix) and a ligand comprising a weakly (WAX) or strongly (SAX) basic functionality (AX) being ionized under the conditions of use and thus representing an anion-exchange site, a site which is suitable for non ionic interaction (NI), and linkers (L) between these modules. The non ionic interaction site and depending on its structure together with the linker allow the adjustment of the overall hydrophobicity/hydrophilicity of the sorbent. The linker sites (L) in Formula I can have independently from each other any meaning detailed below. According to the present invention the anion-exchange groups are based on monobasic cyclic systems with endocyclic nitrogen and with two or more rings as secondary, tertiary or quaternary amine groups, such as obtained through incorporation of e.g. a quinuclidine and tropane ring system. Anion-exchange sites according to the present invention are described in more detail in a dedicated chapter ("The Anion Exchange Site (AX)").

In the following details are given concerning the selection of support (SUP), basic functionality ((AX), (WAX), (SAX)), non-ionic interaction site (NI), and linker (L).

The Support (SUP):

For most applications the ligands according to the invention need to be immobilized on solid or occasionally in liquid-liquid phase systems also liquid matrices called support. In all cases the support forms a separate phase and allows that the ligands are properly exposed to the surrounding solution, which contains the target compounds to be selectively recognized, enabling their binding. Thus the chemical and physical nature of the carrier is variable, and the immobilization may be either adsorptive or covalent, the latter being strongly preferred. The support should be inactive (inert) with regard to binding of the target compound, but has the function to guarantee the chemical and physical stability of the sorbent. In flow-through applications like chromatography the support, and thereby its physical properties, determines the kinetic properties of the sorption materials. In the present invention the support may be an inorganic, organic, or mixed inorganic-organic hybrid type porous or non-porous material. Such support materials include commercially available and customized (self-made) beads, monolithic or continuous materials, nanoparticles, membranes, resins, surface-confined layers, heterogeneous surfaces, magnetic beads. After appropriate modification of the support with the ligands which are subject of the present invention these materials will be filled, packed or deposited in any shape, container or mold such as column, capillary, μ-chip, disks, stacked layers, and similar formats, enclosure or supporting media (substrate) as technical solutions allowing the application of the materials. Chemically, the supports (matrices) are taken from the group comprising silica ($SiO_2$), alumina ($Al_2O_3$), zirconia ($ZrO_2$), titania ($TiO_2$), graphite, ceramic materials, sol-gel derived materials, organic-inorganic siliceous hybrid materials, optionally substituted crosslinked and non-crosslinked polysiloxanes, anyone of the polymers obtained from vinyl-monomers, optionally substituted crosslinked and non-crosslinked, such as poly(meth)acrylates, poly[hydroxyalkyl (meth)acrylates] poly(meth)acrylamides, polystyrenes, mixed styrene-(meth)acrylate polymers, (ring-opening) methathesis polymers, polysaccharides such as agarose, dextrane, cellulose, starch, polyvinylalcohol, and anyone of these materials specifically functionalized to allow immobilization of the selector. Amongst the preferred supports are porous silica beads, glass beads, poly(meth)acrylate polymer beads, such as poly(glycidyl methacrylate-co-ethylene methacrylate) and poly(hydroxethyl methacrylate-co-ethylene methacrylate), poly(meth)acrylamide beads, silica monoliths, poly(meth)acrylate and polystyrene monoliths, poly(meth)acrylamide monoliths, polystyrene resins, which optionally are modified with pendent reactive groups for immobilization of the selector. As support may be regarded also a linear synthetic or natural polymer backbone or entangled polymer matrix so that spacer and ligand actually represent pendent groups of the polymer responsible for selective molecular recognition of the target compounds. Graft polymers are another class of useful supports.

Supports of the categories mentioned above are well known in the art. Many of these supports are available commercially.

The Anion Exchange Site (AX):

One of the interaction sites and binding domains of the ligand is the anion-exchange site (AX). The anion-exchange site is resulting from incorporation of a synthon with a secondary, tertiary, and/or quaternary amino functionality or an amidine or guanidine functionality. Thus according to the present invention the anion-exchange site is an aza derivative of a cyclic compound with two or more ring structures comprising a basic group selected from secondary, tertiary, and/or quaternary amine groups, or amidine, or guanidine groups. The cyclic compound might be saturated or (partially) unsaturated, however not heteroaromatic. Examples of such ring systems are 1-azabicyclo[2.2.2]octane (quinuclidine), 8-azabicyclo[3.2.1]octane, 8-methyl-8-azabicyclo[3.2.1]nonane, 9-azabicyclo-[3.3.1]nonane, 1-azabicyclo[4.4.0]decane as obtained through incorporation of a quinuclidine and tropane ring. Similar more complex ring systems like the tricyclic ring systems may be derived from 1-aza-adamantane. Therefore the term oligocyclic aza compounds is used as generic term for ring systems containing endocyclic nitrogen in cyclic systems with two or more rings as secondary, tertiary, and/or quaternary amine groups. Examples of bicyclic and tricyclic synthons as exemplified above are depicted in Formula II. These functional groups are protonated under the conditions the materials are used and hence ionized. Thus positively charged groups may interact with complementary negatively charged groups of the solutes in the contacted solute mixture by ionic (electrostatic) interaction as with conventional ion-exchanger materials. Examples of tricyclic ring systems derived from 1-aza-adamantane or 1,3-diaza-adamantane are disclosed in Angew.Chemie (1962) 74, pages 361-374. Other tricyclic synthons are available commercially: e.g. 3,5,7-trimethyl-1-aza-adamantan-4,6,10-trione or 1,3,5-triaza-adamantan-7-ylamine.

According to the present invention the anion-exchange site stems from heteroalicyclic aza compounds with two or more rings and with at least one of secondary, tertiary, and/or quaternary amino group. Ligands with secondary and tertiary amines form weak basic structures. The secondary and tertiary amino group of these synthons may be easily quaternized as last step of the selector synthesis yielding quaternary amines and strong basic selectors.

Typically the endocyclic nitrogen in the aliphatic oligocyclic aza compounds provides the anion-exchanger site. In preferred embodiments a nitrogen atom of the AX site is part of two ring structures. The following ring systems are examples of such a structure: the quinuclidine, the tropane, the 1-aza-adamantane, the pyrolizidine, and the chinolizidine, as well as the 1-aza-adamantane ring system. Hydrogen atoms of the ring system can be replaced by one or more residues selected from R, X, N(R')$_2$, SR', OR', COOR', wherein R can be $C_1$-$C_5$ allyl, $C_2$-$C_4$ alkenyl, X is halogen, in particular Cl or Br, R' is H or $C_1$-$C_5$ alkyl. If R is $C_1$-$C_5$ alkyl, R can be substituted by X, N(R')$_2$, SH, OH, COOH, wherein X and R' have the same meaning as above. If there is more than one substitution the substituting groups can be the same or different.

If a stereogenic center or any other chiral element is present in the ligand, the present invention encompasses all individual stereoisomers, and any racemic or non-racemic mixture, and mixtures of individual stereoisomers in any ratio.

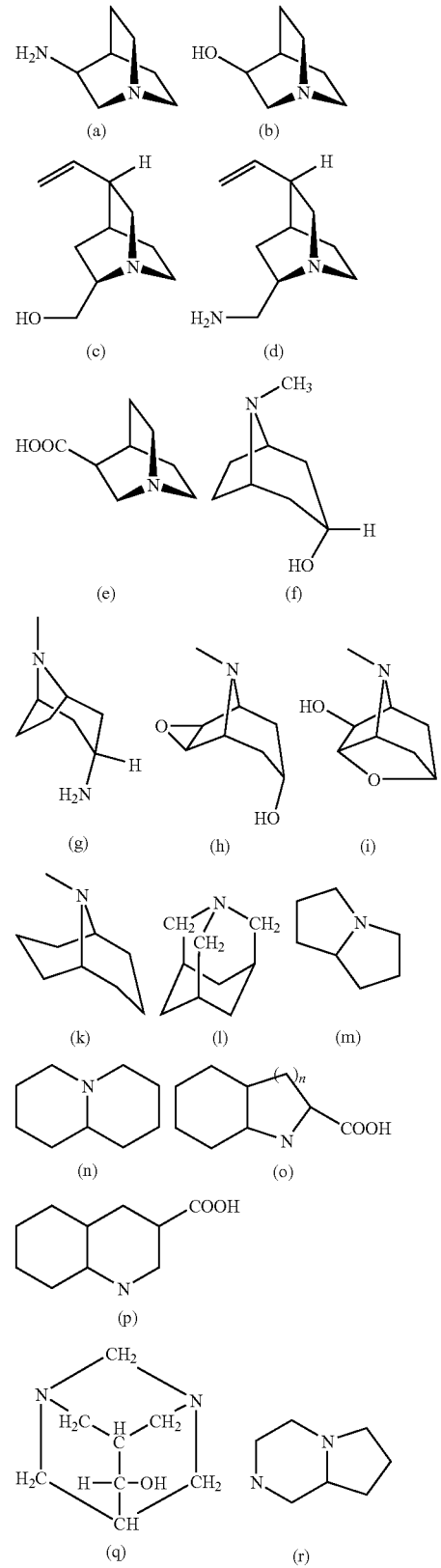

Formula II

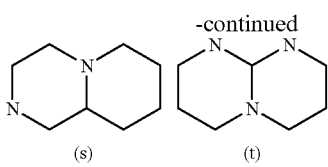

(s)   (t)

Formula II gives examples of synthons for the generation of the anion-exchange site in the ligands (selectors) of the materials according to the present invention: Formulae II (a) through (e): quinuclidine derivatives with different substitution; (D: tropanol; (g): aminotropane; (h): scopin; (i): scopolin; (k): pseudopelletierin; (l): 1-aza-adamantane; (m): 1-azabicyclo[3.3.0]octane (pyrrolizidine); (n): chinolizidine; (o): 2-azabicyclo[4.3.0]nonane-2-carboxylic acid (n=1), respectively 1-azabicyclo[4.4.0]decane-2-carboxylic acid (n=2); (p): 1-azabicyclo[4.4.0]decane-3-carboxylic acid; (q): 1,3-diaza-adamantan-6-ol; (r): 1,4-diazabicyclo[4.3.0]-nonane; (s): 1,4-diazabicyclo[4.4.0]decane; (t): 1,5,7-triazabicyclo[4.4.0]decane.

In preferred embodiments the ligand comprises an oligocyclic mono aza compound with one endocyclic nitrogen atom as exemplified in FIGS. II(a) through (p). Especially preferred are ligands comprising an oligocyclic mono aza compound, wherein the endocyclic nitrogen atom is part of at least two ring systems, as exemplified in FIGS. II (a) through (n). Mostly preferred are ligands which comprise an oligocyclic aza compound with endocyclic nitrogen, which is selected from 1-azabicyclo[2.2.2]octane (quinuclidine), 8-azabicyclo[3.2.1]octane, 8-methyl-8-azabicyclo[3.2.1]nonane (tropane), 9-azabicyclo[3.3.1]nonane, 1-azabicyclo[4.4.0]decane, and 1-aza-adamantane.

As the comparison experiments show the anion-exchanger site with its aliphatic oligocyclic aza compounds evidently causes the surprising superiority of the ligands according to the present invention in comparison to non-cyclic aliphatic analogs of prior art. This is demonstrated by example C1. As demonstrated in example C2 the anion-exchanger site according to the present invention evidently causes also a surprising superiority compared to ligands comprising the 1,4-diazabicyclo[2.2.2]octane (DABCO) synthon.

The Non-Ionic Interaction Site (NI):

The non-ionic interaction site (NI-site; see Formula I) allows to introduce a second mode of interaction. Dependent on the solute to be separated this site might act in reversed phase (RP) mode, in hydrophobic interaction (HIC) mode, or by means of hydrophilic interaction (HILIC). In more detail, the materials according to the present invention are comprised of a mixed-modal reversed-phase/anion-exchange (RP/AX), mixed-modal hydrophobic interaction/anion-exchange (HIC/AX) mixed-modal hydrophilic interaction/anion-exchange (HILIC/AX) selectors, or any AX selector with hydrophobicity properties lying somewhere in between the two extremes of the HILIC and RP lipophilicity scale, and a solid or liquid (polymeric) support (herein also termed carrier or matrix). The ligand structure represents the interactive moiety on the surface of the materials providing selective binding and thus separation of solutes in a mixture, when they are brought in contact with the material in a liquid-phase environment, while the carrier is per definition usually inert or ineffective in terms of interaction with the solutes to be separated. Of central importance for the present invention is therefore the chemical structure of the ligand which contains all the distinct modular binding sites, constituting the present invention, in a single ligand moiety, whereby the positional, geometrical and spatial arrangement of the individual binding domains in the ligand is variable and may adopt any feasible combination. This variability is even more advanced in the more complex structures wherein the (AX) and/or the (NI) site is present in more than one moiety. Examples of such ligand structures are depicted in Formula Ic to If. Due to this variability such more complex ligands represent an invention of its own right, even if the ion exchange group is one already known in the art.

The non-ionic interaction module allows the tuning of the selector's overall hydro-phobicity and hydrophilicity, respectively, and hence also of the final material. The linker sites will contribute primarily hydrogen and/or electron donor/acceptor sites. If the chemical synthon introduced as non-ionic interaction site is a highly hydrophobic group such as a linear or branched aliphatic alkyl chain a mixed-modal RP/AX material will be obtained. On the other hand if non-ionic interaction site is a very hydrophilic group such as polyether, polyhydroxylated allyl chain, polyamide, or oligopeptide chain a mixed-modal HILIC/AX material will result. If the NI site(s) of the mixed-mode anion-exchangers of the present invention is properly balanced, a single mixed-mode anion-exchange material can be use in RP-AX, HIC-AX, as well as in HILIC-AX modes. This holds true for the material according to example A1, as the use examples B1, B4, and B5 show. In any case, the binding and separation mechanism will be the result of a cooperational effect of the sequentially linked individual domains, far beyond the performance of the individual domains alone. For the preparation of the mixed-modal reversed-phase/anion-exchange (RP/AX) materials the non-ionic interaction site is represented by a long hydrophobic optionally substituted aliphatic linear or branched $C_3$-$C_{30}$ alkyl chain, whereby one or more non-adjacent (—$CH_2$—)-groups can be replaced by sulfur (—S—). The alkyl strand is either located between anion-exchange group and support (e.g. Formula Ia) so that the RP/AX material has a terminal anion-exchange site at the interface or it is directly exposed to the surface so that the anion-exchange site is in the interior (e.g. Formula Ib).

In case of the hydrophobic interaction/anion-exchange (HIC/AX) material the non-ionic interaction site is represented by a moderately hydrophobic aliphatic $C_1$-$C_6$, preferably $C_3$-$C_4$, or aromatic or heteroaromatic group, whereby all the other definitions are the same as for the RP/AX materials.

In case of the hydrophilic interaction/anion-exchange (HILIC/AX) material the non-ionic interaction site is represented by a hydrophilic group. Examples of suitable synthons are shown in Formula III.

In Formula III examples of synthons for the hydrophilic groups to be used as building blocks for the HILIC domains of the HILIC/AX materials are depicted (n represents an integer between 0 and 100, preferably between 0 and 20):

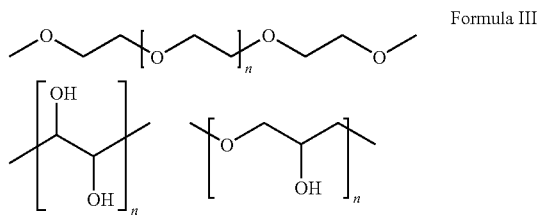

Formula III

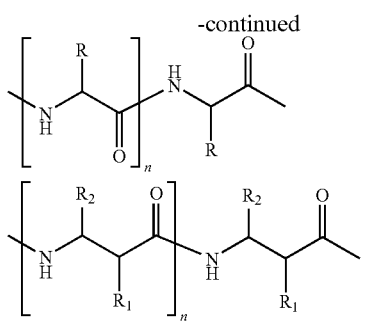

Typical building blocks for hydrophilic non-ionic interaction sites are amide, sulfonamide, urea, carbamate, thioether, sulfoxide, sulfone, and/or ether groups.

The Linker (L):

Both primary binding domains (anion exchange and non-ionic interaction sites) need to be linked together by appropriate chemical linkers (spacers), and the resulting ligands in turn are also bonded by suitable linkers and spacers to the carrier (see Formula I). According to the present invention the linker can also be a chemical bond between two neighbouring modules. Both length and chemical functionality of the linker are variable. It may participate to some degree in ligand-solute binding with positive but also negative effect on overall selectivity. It may influence the rigidity and accessibility of the ligand sites, thereby also exerting an effect on the binding characteristics. Last but not least it determines the chemical stability of the functional materials and may affect their compatibility with solutes, a factor that is particularly important for biomolecule separation. The spacer linking the individual binding domains and modules, respectively, together can be either a hydrophobic or hydrophilic group depending on the overall lipophilicity character needed for the final ligand. A typical example for a hydrophobic spacer is an alkyl chain, which optionally can be functionalized, e.g. by substitution with alkyl or aryl moieties, or by replacing one or more non-adjacent —($CH_2$)-groups with —S—. Examples of synthons suitable for hydrophilic linkers are amide, sulfonamide, carbamate, ether, sulfone, urea, thioether, and sulfoxide groups, optionally in combination with any other polar chain or functionality. In case of a reversed-phase/anion-exchange material a hydrophilic linker such as an amide, urea, carbamate, or sulfonamide may represent a polar embedded group which adds an additional interaction site capable for hydrogen bonding, module or binding domain. Such a group may be advantageous for polar solutes and also in terms of compatibility with aqueous media containing no or low concentrations of organic solvents.

The anion-exchange synthons shown in Formula II may be connected with the alkyl strand through a polar functional group such as depicted in Formula IV. This hydrophilic functional linker group represents a polar-embedded binding domain, which facilitates the use of the present invented materials without organic modifier or with low organic solvent content. Along with the ion-exchange site it stabilizes the thickness of the lipophilic layer in aqueous dominated mobile phase systems (pendent lateral alkyl chains do not collapse even at 100% aqueous medium), but introduces as polar interactive domain also new selectivities arising through hydrogen-bonding or dipole-dipole interactions with complementary sites of solutes.

In Formula IV synthons for polar linker elements (L) that connect the hydrophobic strand with the anion-exchange synthon are depicted (n represents an integer between 0 and 20); see also Formula I.

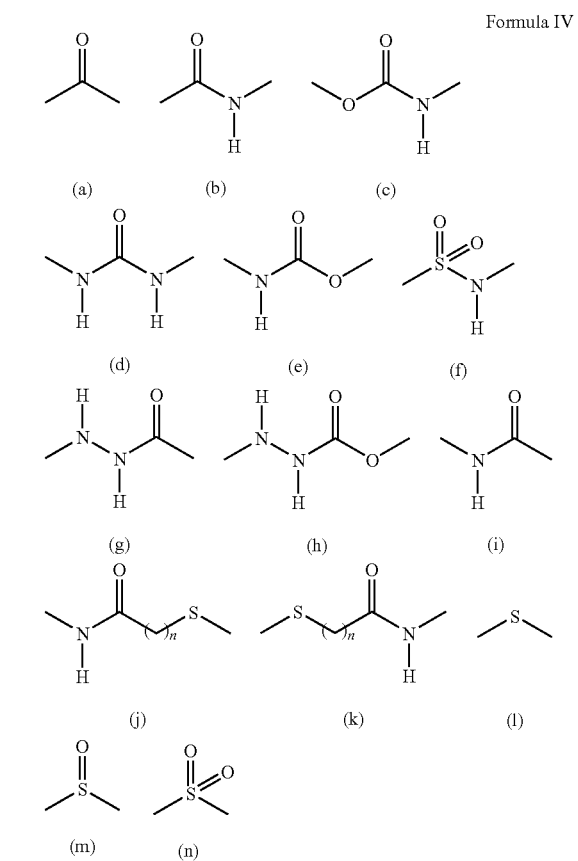

Formula IV

For the immobilization of the ligands (functional selectors) of the present invention on diverse supports all common solid-phase linker concepts and approaches to prepare chromatographic stationary phases may be used. For that purpose various functionalized reactive supports can be utilized including in particular thiol, amino, hydroxyl, activated hydroxyl, carboxylic acid, activated carboxylic acid, aldehyde, epoxy, vinyl, and halogen modified matrices. Some strategies of immobilization that are preferred for the synthesis of presently invented materials are described in the following:

i) on thiol-modified support, including in particular thiolpropyl-modified silica and thiol-modified Fractogel®:
   by reaction with vinyl-modified selector (through radical addition reaction, copolymerization, or Michael addition reaction)
   by reaction with halogen, in particular chloro-, bromo-, and iodo-modified selector by nucleophilic substitution ii) on epoxy group containing support such as Fractogel® epoxy, poly(glycidyl methacrylate-co-ethylene dimethacrylate) monoliths, epoxy-modified silica
   by reaction with thiol, amino, hydroxy group containing ligand or reactive spacer allowing the immobilization of the selector (ligand) in a subsequent step iii) on amino-modified support such as amino-propylsilica or amino-modified Fractogel®
   by nucleophilic substitution reaction with epoxy, halogen, activated hydroxy group containing selector or ligand
   by coupling reaction with carboxylic acid of ligand or modified ligand, or activated carboxylic acid of ligand such as carbodiimide coupling forming peptide bond linkage
   with aldehyde groups of ligand followed by reduction of the Schiff's base intermediate
iv) on carboxylic acid-modified support or activated carboxylic acid-modified support
   by coupling reaction with amino group of ligand or modified ligand, such as carbodiimide coupling forming peptide bond linkage
v) on hydroxyl group containing matrices
   by activation of hydroxyl groups with O,O'-disuccinimidyl carbonate (DSC) or bis-imidazolyl carbonyl (BIC) followed by reaction with amino group of ligand
   by reaction with isocyanate groups of ligand or modified ligand
vi) on activated hydroxyl-group containing matrices such as tresyl-activated beads
   by nucleophilic substitution with amino or thiol group containing ligand
vii) on vinyl-modified supports
   by copolymerization with vinyl-modified ligand
   by radical addition of thiol-group of ligand
Other immobilization concepts that may be utilized include
viii) mono-reaction of a diisocyanate linker asymmetrically with amino or hydroxy-modified selector moiety followed by reaction with amino or hydroxy-modified support
ix) reaction of bis-functional silanes such as 3-isocyanatopropyl triethoxysilane with terminal reactive amino or hydroxy group of selector followed by silylation reaction with silica linking the activated selector to the silica matrix,
x) hydrosilylation reaction of alkoxy- or chlorohydrosilane with vinyl-group containing selector, followed by silylation reaction with silica linking the activated selector to the silica matrix,
xi) coupling of amino-modified support and amino-modified selector by reaction of either of the two components with dicarboxylic anhydride spacer component, and subsequent activation of resulting carboxylic acid function and reaction with second amino component.
xii) other immobilization strategies commonly used to immobilize selectors, proteins and peptides to solid supports and surfaces.
xiii) Alternatively, the chromatographic ligand may be incorporated into the polymeric matrix also by direct in situ copolymerization of the ligand that carries appropriate functionalities. This strategy may be pursued in the suspension polymerization obtaining beads or in the bulk polymerization or bulk polymerization with phase separation such as in the preparation of monoliths.

Formula V (next page) gives an overview of the preferred mixed-modal RP/AX and HILIC/AX materials that illustrate the present invention.

The synthesis of the ligands according to the present invention as well as the binding of said ligands has been described in the examples. Other protocols for similar synthesis protocols are described in standard handbooks and are known to the person skilled in the art.

By implementing the combination of anionic exchange groups and non-ionic interaction modules according to the present invention new surprising molecular recognition capabilities and greatly enhanced or complementary selectivities can be achieved. Thus separation of structurally related compounds are possible, which have not been observed before.

Mixed-modal anion exchange materials according to the present invention take advantage from the high loading capacity of ion-exchange materials while still possessing distinction capability for equally charged species due to the differential recognition capability of the "non-ionic interaction" module and/or existence of repulsive electrostatic ion-ion interaction (ion exclusion).

The dedicated ligand (selector) design according to the present invention also allows the use of purely aqueous media, conditions which are in particular favorable for biopolymer (protein) separations under non-denaturing conditions.

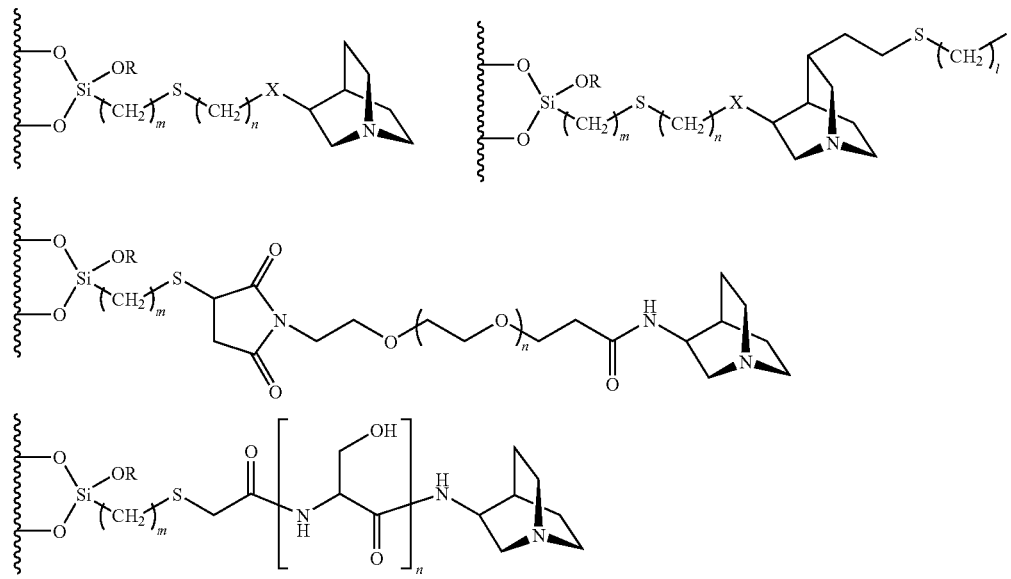

Formula V wherein X =:

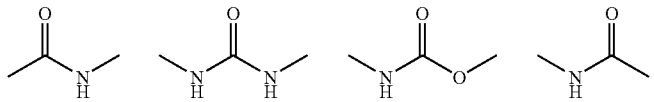

m = 3
1 < n < 100
3 < l < 17

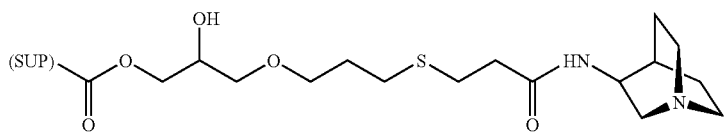

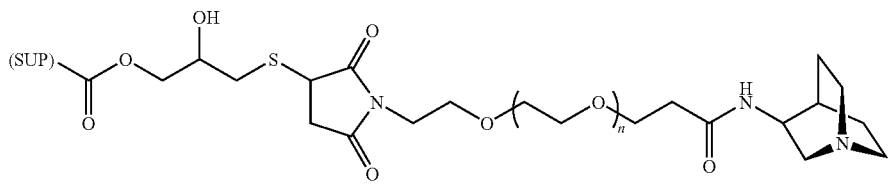

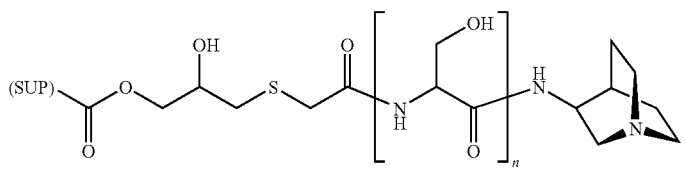

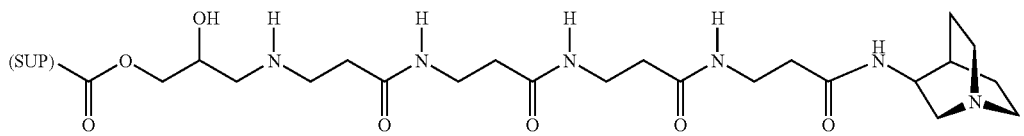

The mixed-mode materials of the present invention may be capable to be used in several distinct chromatographic modes or several mixed-modal chromatographic separation modes in a single column e.g. reversed-phase/anion-exchange (RP/AX), hydrophobic interaction chromatography/anion-exchange (HIC/AX) (or more precisely hydrophobic interaction chromatography/ion-exclusion chromatography), and hydrophilic interaction chromatography/anion-exchange (HILIC/AX) modes. In other words, a single column filled with one of the mixed-mode anion-exchange materials of the present invention can be run in several distinct operational modes, i.e. RP/AX, HIC/AX, HILIC/AX, in which the accomplished selectivities may be different. This is a favorable feature of the materials of the present invention and has not been shown for the materials of prior art. It is clearly documented by the use examples B1(RP/AX), B4 (HILIC/AX), and B5 (HIC/AX).

Without further elaboration, it is believed that one skilled in the art call, using the preceding description, utilize the present invention to its fullest extent. The preferred specific embodiments and examples are, therefore, to be construed as merely illustrative, and not limitative to the remainder of the disclosure in any way whatsoever.

The entire disclosures of all applications, patents, and publications cited above and below, and of corresponding application EP 04028798.9, filed Dec. 12, 2004, are hereby incorporated by reference.

EXAMPLES

A Synthesis Examples

Example A1

RP/WAX Based on Thiol-Modified Silica

The synthesis is outlined in Formula VI, wherein the waved lines represent the support based on silica:

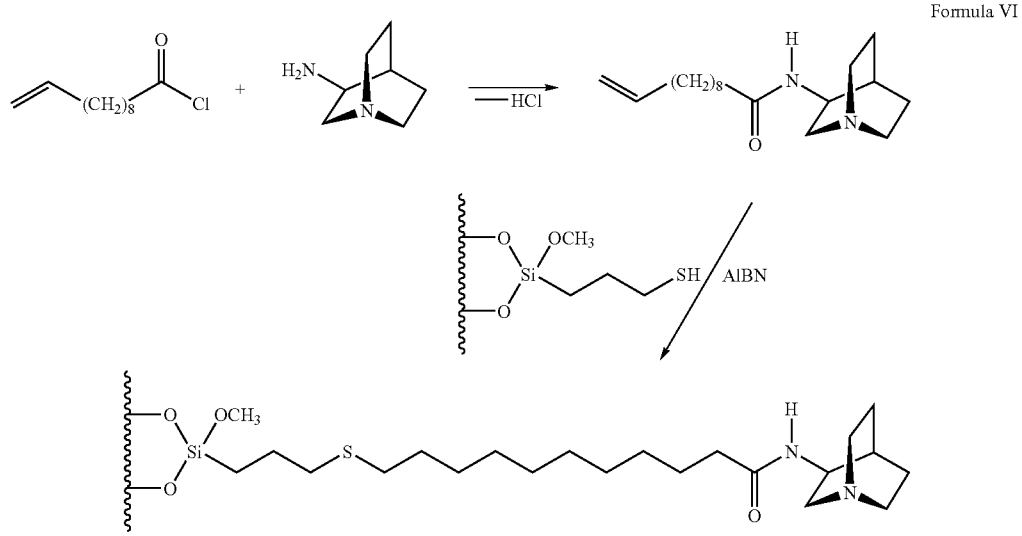

Formula VI a) Synthesis of the Selector

3-Aminoquinuclidine dihydrochloride (26 mmol) is treated for 3 hours with a two-fold molar excess of a freshly prepared sodium methoxide solution in methanol to liberate the free base. The precipitated sodium chloride is removed by filtration and the filtrate is evaporated to dryness. Chloroform is added and to the mixed and cooled suspension a solution of 10-undecenoic acid chloride (22 mmol in chloroform) is slowly added by dropwise addition. The reaction is allowed to proceed for 18 h at room temperature.

From the reaction mixture the N-10-undecenoyl-3-aminoquinuclidine selector is extracted with aqueous 2M sodium hydroxide and chloroform (3×). The combined organic phases are dried with anhydrous sodium sulfate and then evaporated to dryness. After drying under vacuum an oily yellowish product is furnished in 73% yield.

ESI-MS (positive mode): 293.4 amu $[M+H]^+$. $^1$H NMR (400 MHz, $CDCl_3$): 5.80 (m, 1H); 5.55 (d, 1H), 4.98 (d, 1H), 4.93 (d, 1H), 3.95 (m, 1H), 3.35 (q, 1H), 2.80 (m, 4H), 2.43 (m, 1H), 2.20 (t, 2H), 2.05 (m, 2H), 1.90 (m, 1H), 1.65 (m, 5H), 1.47 (m, 1H), 1.30 (s, 10H) ppm.

b) Immobilization of the RP-WAX Ligand on Thiol-Modified Silica 6 g of 3-mercaptopropyl silica gel obtained by refluxing Kromasil® 100-5 μm and 3-mercaptopropyl trimethoxysilane in toluene (4.27% C, 0.89% H, <0.05% N, and 2.62% S, corresponding to a calculated coverage of thiol groups of 0.85 mmol S/g) are suspended in a solution containing 3.0 g selector of step a) above in methanol. 50 mg AIBN are added as radical initiator and the reaction allowed to proceed for 6 hours under continuous stream of nitrogen at reflux. The modified silica gel is washed several times with methanol and dried for 72 hours. The elemental analysis yields the following results: 14.50% C, 2.40% H, and 1.32% N, corresponding to an average selector coverage of 0.46 mmol/g modified silica.

Remaining thiol-groups are capped by radical addition of n-hexene (3.2 ml) under otherwise identical conditions as described above for the selector addition. The gel is washed with methanol, 3% acetic acid in methanol, and diethylether, dried for 72 hours, and packed into stainless-steel HPLC columns.

The elemental analysis of the RP/WAX stationary phase after end-capping provides the following results: 14.26% C, 2.32% H, 1.23% N, and 2.12% S.

Example A2

Immobilization of RP-WAX on thiol-Modified polyglycidylmethacrylate Beads 5 g of polyglycidylmethacrylate beads Fractogel® EMD epoxy (M) (Merck, Darmstadt, Germany) (1.5 mmol epoxy groups/g beads) or Suprema® 1000 (Polymer Standard Services, Mainz, Germany) are suspended in 160 mL of a reagent solution containing 8.2 g of sodium hydrogen sulfide dissolved in a mixture of 50 mM phosphate buffer, pH 8 and 2-propanol (4:1, v/v). The suspension is sonicated and purged with $N_2$ (each 5 min). The suspension is mechanically stirred for 20 h at 60° C. After filtration, the derivatized beads are washed with 0.1 M HCl, water, and then MeOH. The thiol-modified particles are dried overnight under vacuum and subjected to elemental analysis, which yields the following results:

| Sorbent | % C | % H | % N | % S |
|---|---|---|---|---|
| Suprema® | 51.84 | 6.68 | 0.07 | 7.40 |
| Fractogel® | 51.05 | 7.14 | 0.05 | 4.00 |

This corresponds to a thiol-loading of 1.25 mmol sulfhydryl groups/g modified beads for the Fractogel® material and 2.31 mmol sulfhydryl groups/g modified beads for the Suprema® material.

The immobilization of the RP/WAX selector (N-10-undecenoyl-3-aminoquinuclidine) is carried out by the same protocol as described in example A1.

Example A3

Immobilization of RP-WAX on Monolithic Silica

The reaction scheme is outlined in Formula VII. The upper left hand silica structure shows the silanol groups of the support based on silica. The waved lines represent the support based on silica:

Formula VII

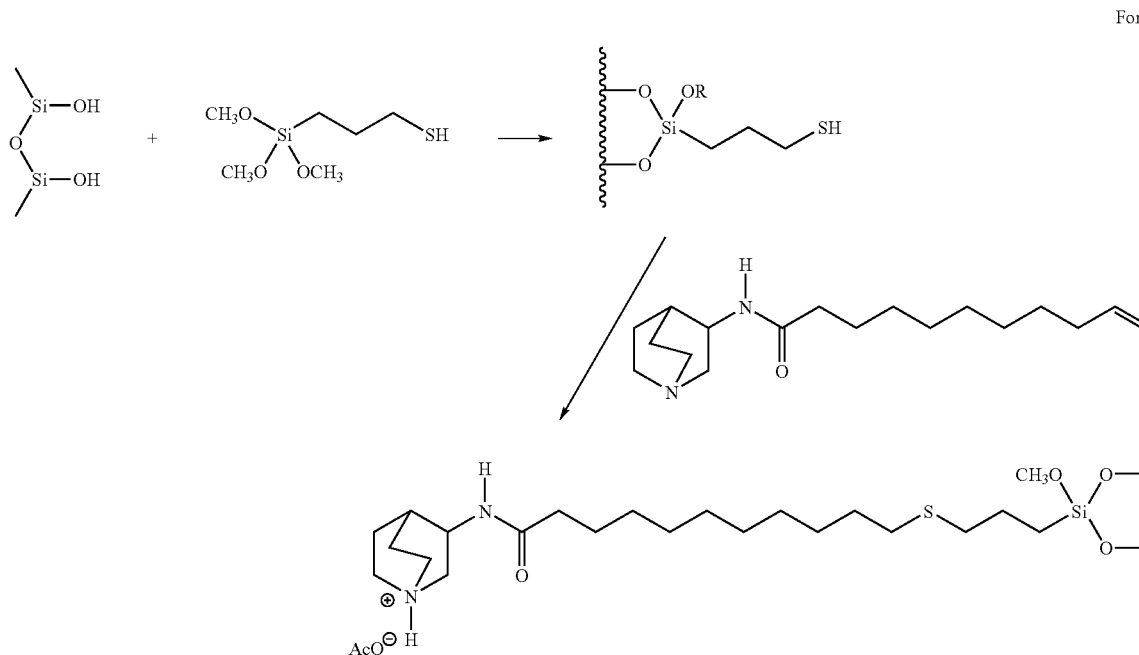

a) Preparation of Thiol-Modified Silica Monolith (in Column Silanization)

A Chromolith® Si Performance 100-4.6 mm column (10 cm in length and 4.6 mm i.d. containing approximately 0.5 g of silica gel) (Merck KGaA, Darmstadt, Germany), encased in a PEEK plastic cover, is dried for five hours under vacuum at 100° C. 10 ml of a solution of 0.7 ml 3-mercaptopropyltrimethoxysilane (ABCR-GmbH Karlsruhe, Germany) in dry toluene containing 0.2 ml of dry pyridine is pumped through the dried Chromolith®g Si column at a volumetric flow rate of 0.2 ml/min. During the reaction (1h), the monolithic silica column is stored inside an HPLC column oven at 80° C. The mercaptopropyl-modified silica monolith is washed with toluene for 1 hour at 80° C. at a volumetric flow rate of 0.5 ml/min and one additional hour at a volumetric flow rate of 0.5 ml/min at ambient temperature. The procedure is repeated with another Chromolith® column, which is removed from the PEEK housing after the modification, dried in vacuum and subjected to elemental analysis. Elemental analysis yields a carbon content of 4.3% corresponding to a surface coverage of 4.54 μmol thiol groups/$m^2$.

b) Immobilization of the RP-WAX Ligand on Thiol-Modified Silica Monolith (in Column Derivatization)

The RP/WAX selector (N-10-undecenoyl-3-aminoquinuclidine; see example A1) is immobilized on above described thiol-modified monolithic silica column (100×4.6 mm i.d.) by in-column modification using a radical addition reaction in analogy to the protocol described in example 1 for the particles. Thus, 0.07 g of N-10-undecenoyl-3-aminoquinuclidine and 10 mg AIBN are dissolved in 6 ml ethanol. This solution is pumped slowly through the thiol-modified monolithic silica column, which is pre-conditioned with ethanol, at 80° C. over a period of 100 min. In order to remove the unreacted reagents, the column is afterwards washed with ethanol at a volumetric flow rate of 0.5 ml/min for an additional 60 minutes. Elemental analysis, which is performed after the tests on the column had been finished, provides a surface coverage 0.7 μmol RP/WAX selector/$m^2$.

Example A4

Immobilization of RP-WAX on Organic Polymer Based Monolithic Support a) In-situ Preparation of poly(GMA-co-EDMA) Type Monolithic Capillaries A polymerisation mixture is prepared from 30 wt % cyclohexanol and 30 wt % 1-dodecanol as porogenic solvents, 24 wt % glycidyl methacrylate (GMA) as functional monomer and 16 wt % ethyleneglycol dimethacrylate (EDMA) as crosslinker containing 1 wt % α,α'-azoisobutyronitrile (AIBN) as radical initiator (with respect to the total monomer content) (all obtained from Sigma-Aldrich). The mixture is sonicated and purged with nitrogen (each 10 min). Vinylised (i.e. 3-methacryloyloxypropyltrimethoxysilyl-modified) fused-silica capillaries of a total length of about 40 cm are filled to a length of 30 cm with the polymerisation mixture employing a Hamilton syringe and sealed with rubber GC-septa at both ends. The polymerisation is carried out in a water bath at a temperature of 60° C. for 20 hours. Subsequently the capillaries are rinsed with acetonitrile to remove the porogenic solvents and non-reacted monomers using an HPLC pump.

b) Procedure for Preparation of Polymethacrylate Monoliths with Reactive Sulfhydryl Groups A 2 M solution of sodium hydrogen sulfide (Sigma-Aldrich) in a mixture of methanol and 0.1 M aqueous sodium dihydrogenphosphate (20:80, v/v) is freshly prepared. The pH is adjusted to 8.15, the reagent solution sonicated for 5 mill, and filtered through a Nylon membrane (Iso-Disc™ Filter, N-13-2; 13 mm×0.2 μm; Supelco).

The reactive poly(GMA-co-EDMA) monolith capillaries, pre-conditioned with methanol/water (20:80, v/v), are then flushed with 60 μl of the sodium hydrogen sulfide solution using a Hamilton syringe and a syringe pump at a flow rate of 30 μl/h. After reaction the capillaries are attached to an HPLC pump and rinsed with methanol/water (20:80, v/v) and then with acetonitrile.

c) In Column Immobilization of the RP-WAX Ligand by Radical Addition Reaction

A 0.25 M solution of the RP/WAX selector (N-10-undecenoyl-3-amino-quinuclidine; see example A1) in ethanol containing α,α'-azoisobutyronitrile (AIBN) (0.025 M) as radical initiator is freshly prepared. The mixture is sonicated (5 min) and then filtered through a Nylon membrane. After purging with nitrogen for 10 min the thiol-functionalised capillaries are flushed with 30 μl of the selector solution using a Hamilton syringe and a syringe pump. The capillaries are sealed with GC-septa and transferred to a water bath, where the radical addition of the chromatographic ligand occurs at 60° C. overnight. After 24 hours the capillaries are removed from the water bath, rinsed with methanol and then equilibrated with mobile phase using an HPLC pump for the chromatographic test.

Example A5

RP-WAX on Organic Polymer Based Monolithic Disks

A 2 M solution of sodium hydrogen sulfide in a mixture of 2-propanol and 0.1 M aqueous sodium dihydrogenphosphate (20:80, v/v) is freshly prepared. The pH is adjusted to 8.15, the reagent solution sonicated for 5 min, and filtered through a Nylon membrane. In this solution an epoxy-group containing polymethacrylate type monolithic disk (CIM® Epoxy, BIA Separations, Ljubljana, Slovenia), which is pre-conditioned with 2-propanol/water (20:80, v/v), is immersed and the epoxide ring opening reaction by hydrogen sulfide allowed to proceed at ambient temperature for 3 h. Subsequently, the disks are washed several times with methanol/water (20:80, v/v).

A 0.25 M solution of the RP/WAX selector (N-10-undecenoyl-3-amino-quinuclidine; see example A1) in 2-propaanol containing α,α'-azoisobutyronitrile (AIBN) (0.025 M) as radical initiator is freshly prepared. The mixture is sonicated (5 min) and then filtered through a Nylon membrane. After purging with nitrogen for 10 min the thiol-functionalised polymethacrylate type monolithic disk is immersed in this selector solution and warmed to 60° C. The radical addition of the N-10-undecenoyl-3-aminoquinuclidine selector to the thiol groups occurred overnight keeping the reaction mixture at 60° C. and under nitrogen. After removal of the disk from the reaction mixture it is subsequently washed with 2-propanol, 2-propanol/water (20:80, v/v), and methanol, and then dried under vacuum.

Example A6

Mixed-Modal Reversed Phase (RP)/Strong Anion-Exchange (SAX) Material Based on Thiol-Modified Silica The reaction scheme is outlined in Formula VIII, wherein the waved lines represent the support based on silica:

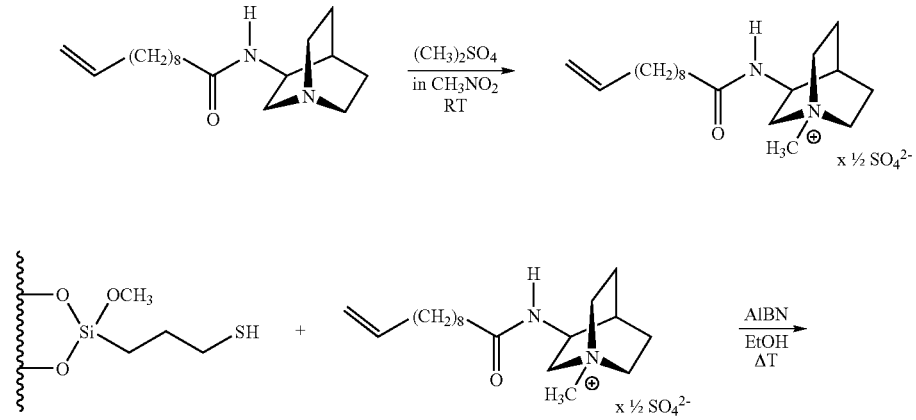

Formula VIII

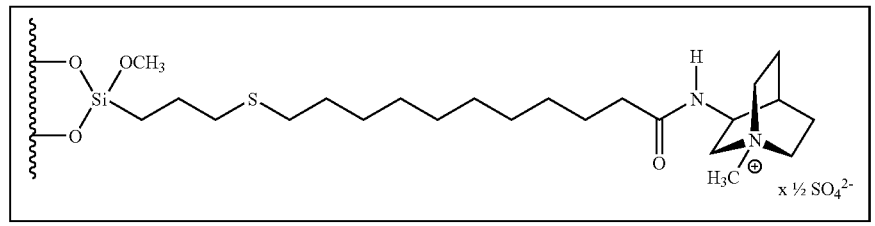

5 mmol of the N-10-undecenoyl-3-aminoquinuclidine selector (see example 1) are dissolved in 50 mL nitromethane. 2.5 mmol of dimethyl sulfate are added and the reaction mixture is allowed to stand at ambient temperature overnight. The reaction mixture is evaporated to dryness and the residue washed with petrolether.

The crude product is dissolved in ethanol/water and immobilized on thiol-modified silica as described in example A1.

Example A7

Preparation of RP/WAX Material with Terminal Hydrophobic Domain and Internal Ion-Exchange Site The reaction scheme is outlined in Formula IX, wherein the waved lines represent the support based on silica:

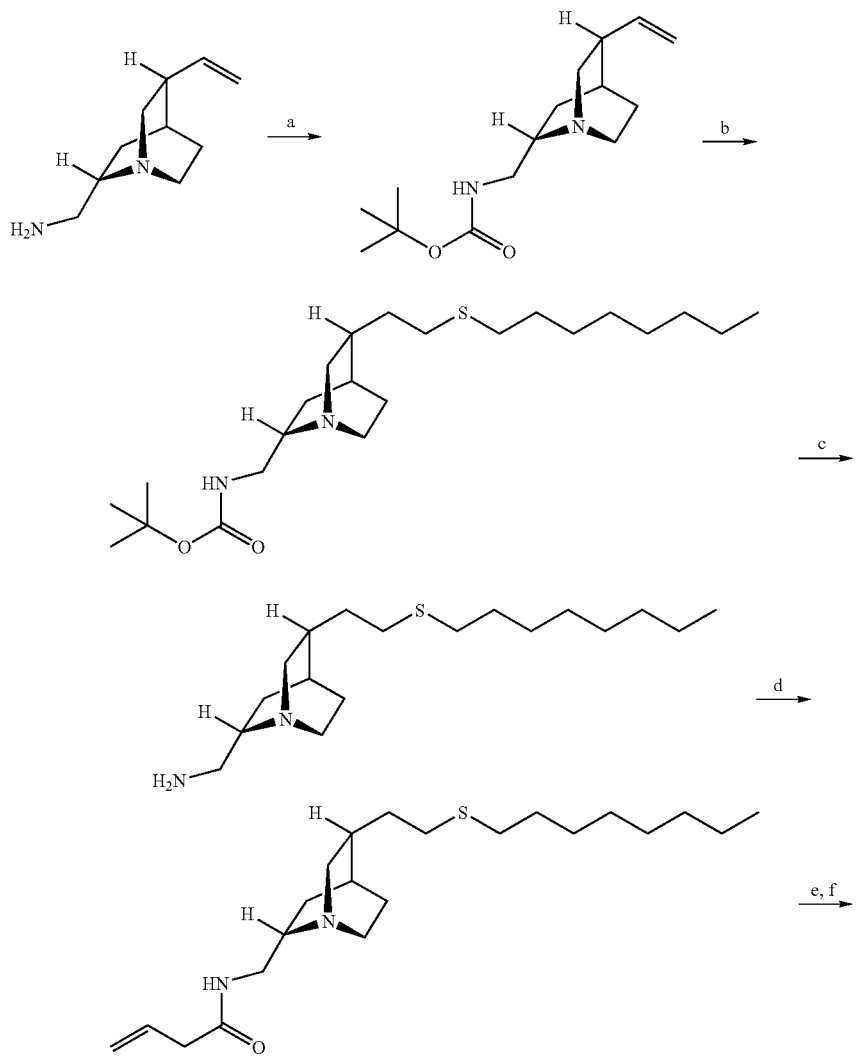

Formula IX

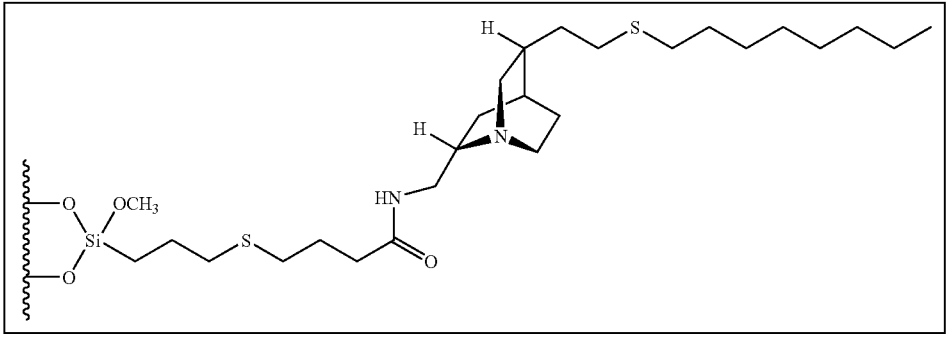

a) t-BOC-derivative of (2S,4S,5R)-2-aminomethyl-5-vinyl-quinuclidine 6.62 g (40 mmol) of (2S,4S,5R)-2-aminomethyl-5-vinyl-quinuclidine are dissolved in 55 ml dichloromethane. 55 ml of an aqueous solution of sodium carbonate (8.06 g in 100 ml distilled water) as well as 9.79 g (45 mmol) of di-tert-butyl-dicarbonate, $(Boc)_2O$, are further added. The reaction is allowed to proceed overnight at room temperature under stirring.

The reaction mixture is transferred to a separation funnel and the upper aqueous phase is discarded. The lower organic layer is repeatedly extracted with sodium carbonate solution. The combined organic fractions are dried with anhydrous sodium sulfate and the solvent evaporated.

yield: 67%

$^1$H NMR (400 MHz, $CDCl_3$): 5.8 (m, 1H), 5.2 (s, 1H), 4.97 (d, 2H), 3.27 (m, 1H), 3.13 (q, 1H), 2.9 (m, 2H), 2.82 (m, 1H), 2.60 (m, 2H), 2.26 (m, 1H), 1.85 (t, 1H), 1.7 (m, 1H), 1.47 (m, 2H), 1.35 (s, 9H), 0.85 (m, 1H)

b) t-BOC-derivative of (2S,4S,5R)-2-aminomethyl-5-[(2-octylthio)ethyl]-quinuclidine 7 g (26.5 mmol) of (2S,4S,5R)—N-t-Boc-2-aminomethyl-5-vinyl-quinuclidine are dissolved in chloroform. A 5-fold molar excess of octanethiol and AIBN (10 mol % related to the quinuclidine derivative) are added. The reaction is allowed to proceed overnight for 24 h under reflux. The reaction mixture is condensed to dryness and the crude product purified by flash chromatography (silica gel, first chloroform, then chloroform-methanol (5:1, v/v), finally chloroform-methanol (20:1, v/v). The combined eluates containing the product are evaporated to dryness and directly used for the next step.

$^1$H NMR (400 MHz, $CDCl_3$): 5.5 (s, 1H), 3.4 (s, 1H), 3.25 (t, 1H), 3.1 (t,s, 3H), 2.73 (s, 1H), 2.50 (m, 5H), 1.91 (t, 1H), 1.80 (s,s, 2H), 1.68 (m, 2H), 1.58 (m, 4H), 1.45 (s, 9H), 1.38 (t, 2H), 1.28 (s, 9H), 1.02 (m, 1H), 0.90 (t, 3H)

c) Cleavage of Protection Group 8.2 g (20 mmol) of (2S,4S,5R)—N-t-Boc-2-aminomethyl-5-[(2-octylthio)ethyl]-quinuclidine as obtained by flash chromatography are dissolved in 100 ml dichloromethane and 15 ml trifluoroacetic acid (TFA) are added under magnetic stirring. The reaction is allowed to proceed for 3 h at ambient temperature. The reaction mixture is evaporated to dryness and extracted with 1 M NaOH/dichloromethane. The combined organic fractions are dried over anhydrous sodium sulfate and evaporated. A yellow oil is obtained, which is used without further purification in the next step.

ESI-MS (positive mode): 313.3 amu $[M+H]^+$. $^1$H NMR (400 MHz, $CDCl_3$): 3.04 (q, 1H), 2.77 (m, 1H), 2.60 (d, 2H), 2.47 (m, 2H), 2.34 (m, 4H), 2.25 (dd, 1H), 1.67 (m, 1H), 1.53 (m, 4H), 1.40 (m, 2H), 1.32 (m, 2H), 1.20 (t, 2H), 1.10 (s, 10H), 0.71 (t, 4H)

d) Coupling of vinylacetic acid and (2S,4S,5R)-2-aminomethyl-5-[(2-octylthio)ethyl]-quinuclidine 3.99 g (12.79 mmol) of (2S,4S,5R)-2-aminomethyl-5-[(2-octylthio)ethyl]-quinuclidine is dissolved in dichloromethane. An equimolar amount of vinylacetic acid (12.79 mmol) and 14.7 mmol N,N'-diisopropylcarbodiimide (DIC) are added dropwise, while the reaction mixture is kept under ice cooling. The reaction is allowed to proceed overnight (12 h) at room temperature. A suspension is formed. The precipitation is removed by filtration and the reaction mixture condensed to dryness under reduced pressure.

The crude product is purified by extraction with dichloromethane and 1M NaOH. The collected organic phases are dried with anhydrous sodium sulfate and evaporated to dryness. The raw product is finally purified by flash chromatography (silica gel, first chloroform, then chloroform/methanol, 5:1).

ESI-MS (positive mode): 381.5 amu $[M+H]^+$. $^1$H NMR (400 MHz, $CDCl_3$): 6.29 ppm (s, 1H), 5.94 ppm (m, 1H), 5.20 (s, 1H), 5.16 (d, 1H), 3.55 (m, 1H), 3.17 (q, 1H), 2.98 (d, 2H), 2.87 (m, 3H), 2.60 (m, 1H), 2.49 (q, 4H), 2.37 (d, 1H), 1.85 (m, 1H), 1.71 (m, 2H), 1.65 (m, 2H), 1.57 (m, 2H), 1.51 (m, 2H), 1.37 (t, 2H), 1.28 (s, 9H), 0.93 (m, 1H), 0.88 (t, 3H).

e) Immobilization of the RP/WAX Selector on Thiol-Modified Silica

The covalent bonding of the RP/WAX selector as well as the subsequent end-capping step are carried out following exactly the same protocol as described in Example A1 for the N-10-undecenoyl-3-aminoquinuclidine selector.

Example A8

Synthesis of HILIC/WAX Stationary Phase Based on PEG Synthon

The reaction scheme is outlined in Formula X, wherein the waved lines represent the support based on silica, and wherein n=3:

Formula X

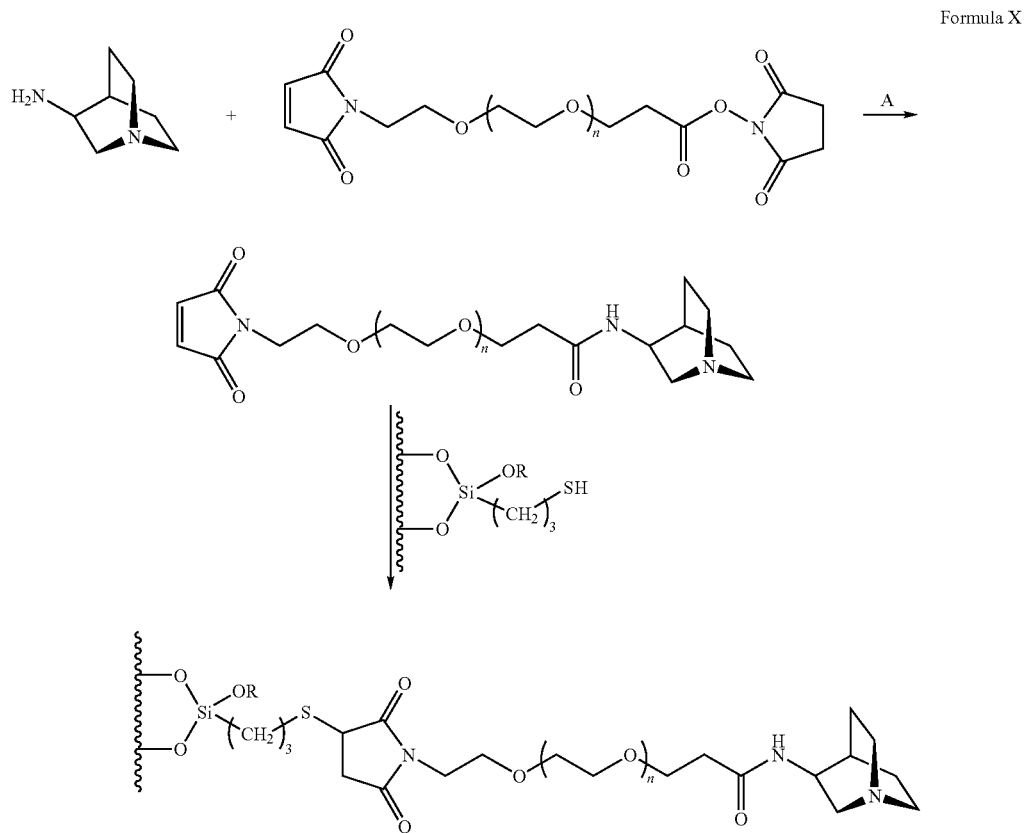

3-Aminoquinuclidine dihydrochloride (3 mmol) is treated for 3 hours with a two-fold molar excess of a freshly prepared sodium methoxide solution in methanol to liberate the free base. The precipitated sodium chloride is removed by filtration and the filtrate is evaporated to dryness. The residue is dissolved in dimethylformamide (DMF) and an equimolar amount of Hünig base is added. To the mixed and cooled solution an equimolar amount of 3-[2-(N-Maleimido)ethyl-triethyleneglycol]-propionic acid N-hydroxysuccinimide ester (MAL-dPEG$_4$-NHS ester) dissolved in DMF is added and the reaction mixture stirred overnight at room temperature. The reaction mixture is evaporated to dryness and purified on a DOWEX® weak cation exchanger. The PEG-derivatized aminoquinuclidine (1 mmol) is then dissolved in a mixture of DMF—50 mM phosphate buffer, pH 7.5 (20:80; v/v). 2 g Mercaptopropyl-modified silica is suspended in this solution and allowed to react at room temperature overnight yielding the mixed-modal HILIC/WAX stationary phase depicted in Formula X.

This example can be repeated using PEG derivatives of different chain length: $1 \leq n < 100$ (in particular $1 \leq n < 20$)

Example A9

Synthesis of HILIC/WAX Polymer Gel Based on Peptide Synthon

The reaction scheme is oulined in Formula XI, wherein (SUP) represents the support:

Formula XI

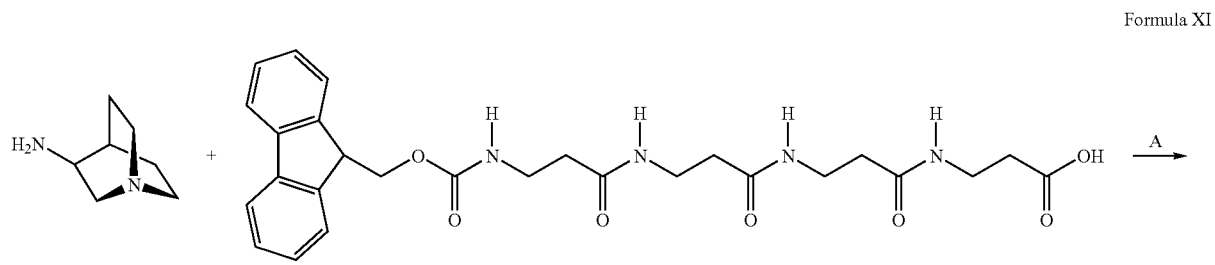

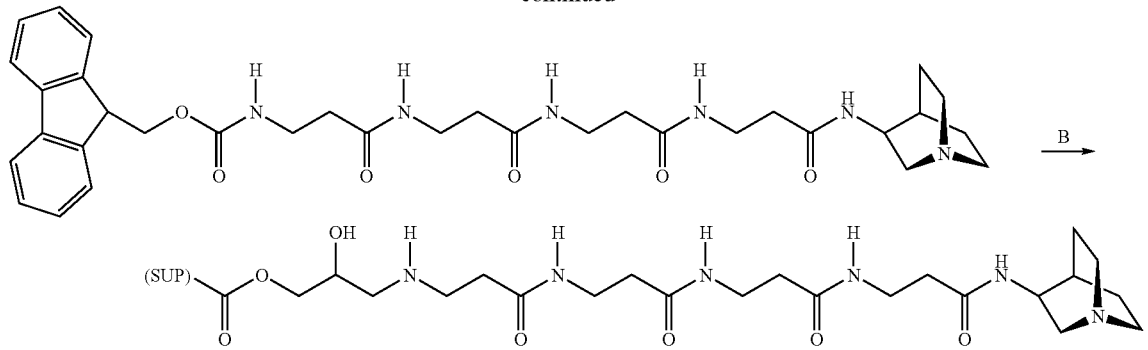

Example A10

Short-Spaced RP-WAX Organic Polymer Material

The reaction product is depicted in Formula XII, wherein (SUP) represents the support:

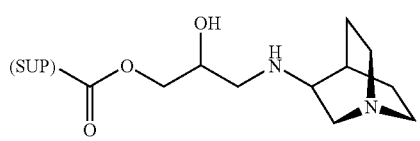

Formula XII

3-Aminoquinuclidine dihydrochloride (3 mmol) is treated for 3 hours with a two-fold molar excess of a freshly prepared sodium methoxide solution in methanol to liberate the free base. The precipitated sodium chloride is removed by filtration and the filtrate is evaporated to dryness. The residue is dissolved in dimethylformamide (DMF) and an equimolar amount of Fmoc-protected (β-alanyl)$_3$-β-alanine (synthesized by standard Fmoc chemistry) as well as DIC and HOBt dissolved in DMF are added. The reaction is allowed to proceed at room temperature overnight. Then the FMOC group is cleaved with 20% piperidine. The resulting tetrapeptide with C-terminal 3-quinuclidinyl amide and free N-terminus is purified by gradient RP-HPLC using water and acetonitrile (both containing 0.1% TFA) on a LiChrospher® C18, 15 μm (250×20 mm ID) as stationary phase. The collected and combined fractions containing the pure tetrapeptide are evaporated to dryness and dissolved in 100 mM Tris buffer (pH 9). Fractogel® epoxy is suspended in this solution and the suspension stirred at 40° C. overnight.

3-Aminoquinuclidine dihydrochloride (3 mmol) is treated for 3 hours with a two-fold molar excess of a freshly prepared sodium methoxide solution in methanol to liberate the free base. The precipitated sodium chloride is removed by filtration and the filtrate is evaporated to dryness. The 3-aminoquinuclidine base is dissolved in methanol and a suspension of Fractogel® EMD epoxy in methanol (1 g/20 ml) is added. The reaction mixture is stirred overnight at 60° C. The aminoquinuclidine-modified Fractogel® beads are filtrated and washed several times with methanol and acetone (coverage 0.68 μmol quinuclidine moieties per gram).

Example A11

RP/WAX Based on 3-α-Aminotropane and Thiol-Modified Silica

The reaction scheme is outlined in Formula XIV, wherein the waved lines represent the support based on silica:

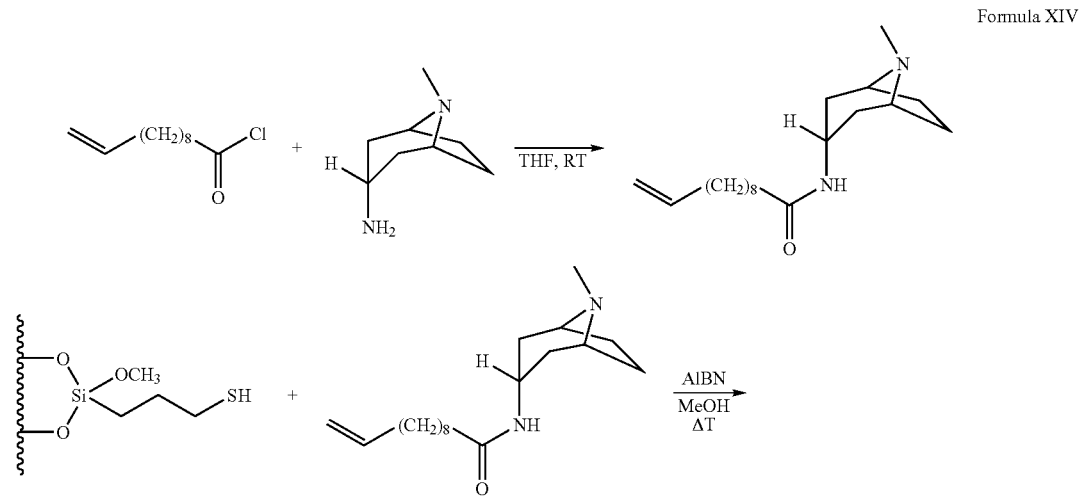

Formula XIV

-continued

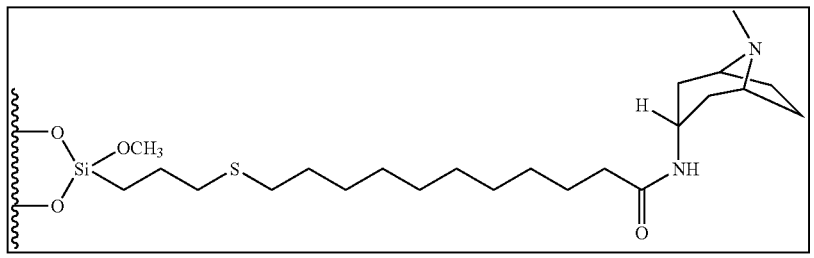

a) Synthesis of the RP/WAX Selector

Formula XV

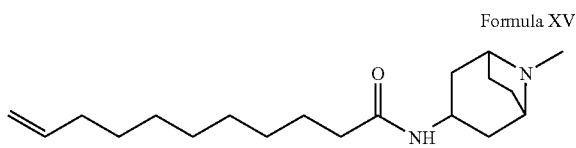

Dry 3-α-aminotropane dihydrochloride (1 equivalent) is suspended in dry tetrahydrofuran (5 mL per mmol amine) in a 3-neck round-bottomed flask under mechanical agitation. The flask is swept with nitrogen for 10 min and chilled in an ice bath. Under strictly anhydrous conditions (use of a stainless steel transfer capillary) a 1.6 M solution of butyllithium (in hexanes; 3.15 equivalents) is slowly added to the reaction mixture (for 50 mmol of amine addition should occur over 5 min). Thereafter, 10-undecenoyl chloride (0.9 equivalents) diluted with dry tetrahydrofuran (0.5 mL per mmol acid chloride) is added drop-wise. The ice bath is removed and the mixture is stirred for additional 30 min.

The crude product obtained by evaporating the volatile fraction of the reaction mixture (40° C., 20 mbar) is re-dissolved in a mixture of ethyl acetate (5 mL per mmol amine) and 1 M aqueous sodium hydroxide solution (2 mL per mmol amine) and transferred to a separation funnel. After removal of the aqueous phase the residual organic phase is extracted one more time with 1 M aqueous sodium hydroxide solution (2 mL per mmol amine) and two times with water (each 2 mL per mmol amine).

The organic phase is dried over potassium carbonate, evaporated, and dried in high vacuum. The yields are in the range of 95%.

Characterisation

ESI-MS (positive mode): 307.4 amu $[M+H]^+$.

$^1$H-NMR (400 MHz, $CDCl_3$): 5.80 (m, 2H), 4.99 (dd, 1H), 4.93 (dd, 1H), 4.07 (q, 1H), 3.14 (m, 2H), 2.28 (s, 3H), 2.20 (m, 2H), 2.14 (m, 4H), 2.04 (m, 2H), 1.71 (m, 2H), 1.61 (m, 4H), 1.41-1-25 (m, 10H) ppm.

b) Immobilization of the N-(10-Undecenoyl)-3-α-aminotropane-Based RP-WAX ligand on Thiol-Modified Silica 6 g of 3-mercaptopropyl silica gel obtained by refluxing Prontosil® 120-5 μm and 3-mercaptopropyl trimethoxysilane in toluene (4.62% C, 1.10% H, <0.05% N, and 2.88% S, corresponding to about 0.9 mmol S/g) are suspended in a solution containing 3.0 g selector of step a) above in methanol. 50 mg AIBN are added as radical initiator and the reaction allowed to proceed for 6 hours under continuous stream of nitrogen at reflux. The modified silica gel is washed several times with methanol and dried for 72 hours. The elemental analysis yields the following results: 11.57% C, 2.13% H, 0.99% N and 2.48% S, corresponding to an average selector coverage of 0.36 mmol/g modified silica.

Remaining thiol-groups are capped by radical addition of 1-hexene (3.2 ml) under otherwise identical conditions as described above for the selector addition. The gel is washed with methanol, 3% acetic acid in methanol, and diethylether, dried for 72 hours, and packed into stainless-steel HPLC columns.

The elemental analysis of the RP/WAX stationary phase after end-capping provides the following results: 11.55% C, 2.11% H, 0.96% N, and 2.40% S.

B Use Examples

Example B1

Application of RP-WAX for the Purification of a Synthetic Peptide

The RP/WAX stationary phase of example A1 which is based on an N-(10-undecenoyl)-3-aminoquinuclidine selector covalently immobilized on thiol-modified silica particles (5 μm, 100 Å pore diameter) by radical addition reaction, is tested for the separation and purification of a synthetic N- and C-protected tetrapeptide (1A) from its side products (1B). The beneficial effect of the separation material according to the present invention is exemplified by the purification of the N- and C-terminally protected tetrapeptide N-acetyl-Ile-Glu-Gly-Arg-p-nitroanilide from side products. The resulting chromatogram is shown in FIG. 1 (curve (a)). Curve (b) shows the separation using a commercial RP sorbent. The following chromatographic conditions are used:

(a) RP/WAX (of example 1), 5 μm particles, column dimension, 150×4.0 mm I.D.; mobile phase, 1% (v/v) aqueous acetic acid (without organic modifier), pH 4.5 adjusted with ammonia.

(b) C18 Beckman Ultrasphere®, 5 μm particles, column dimension, 150×4.6 mm I.D.; mobile phase, 0.1% TFA in water (A) and 0.1% TFA in ACN (B), linear gradient from 5% to 60% of B in 20 min. Other conditions: flow rate, 1 ml/min; temperature, 25° C.; detection, UV 316 nm.

It is seen that the resolution on the RP/WAX material is vastly enhanced ($R_S$=10.0) compared to the separation of the test mixture by standard gradient reversed-phase HPLC ($R_S$=1.9). In loadability studies using acetate, peptide masses up to 200 mg could be injected onto an analytical 250×4 mm ID RP/WAX column (5 μm particles) without touching bands of major impurity and target peptide peaks, while the tests with formate still allowed the injection of 50 mg raw peptide. The analysis of the purified peptide by RP-HPLC with UV and ESI-MS detection employing RP18 columns revealed that the known major impurities are removed by a single chromatographic step employing the RP/WAX stationary phase. Both better selectivity as well as enhanced sample loading capacity in comparison to RP-HPLC resulted in an improved productivity of the new purification protocol. For example, for the given peptide the yield is by a factor of about 15 higher for the RP/WAX purification method compared to a standard RP purification protocol.

Example B2

Simultaneous Separation of Acidic and Weakly Basic or Neutral Compounds (Chlorpyrifos and its Metabolites) in a Single Run Chlorpyrifos is a weakly basic, widely used organophosphorothioate pesticide being non-ionized and thus essentially neutral under typical chromatographic conditions as accommodated on silica-based stationary phases. Intoxication by accidental intake is not uncommon. In humans and other mammalians it is rapidly detoxified by metabolic hydrolysis of the aromatic ester bond and oxidative desulfuration yielding diethyl thiophosphate, diethyl phosphate, 3,5,6-trichloro-2-pyridinol as main metabolites. The acidity of the metabolites in contrast varies between strongly acidic ($pK_a$ of diethyl thiophosphate and diethyl phosphate is around 1.4) and weakly acidic ($pK_a$ of 3,5,6-trichloro-2-pyridinol is around 5.9). The low $pK_a$ values and strong hydrophilicity of the phosphorous metabolites prohibit reasonable retention and therefore separation by reversed-phase HPLC with typical acidic conditions that can be employed on silica-based materials. On the other hand, on the present mixed-modal RP/WAX stationary phase (of example A1) parent chlorpyrifos and all of its major metabolites as well as an internal standard (dibutyl phosphate) can be readily retained and baseline separated with more or less equal band spacing by HPLC. This is exemplified by the separation depicted in FIG. 2, which shows the LC-MS run of a standard mixture of all 5 components. The experimental details are as follows: Simultaneous separation of chlorpyrifos (2A) and its metabolites (2B, 2C, 2E) as well as an internal standard (2D) on mixed-modal RP/WAX based on N-undecenoyl-3-aminoquinuclidine (RP/WAX of example A1). (2B) Diethyl Phosphate, (2C) diethyl thiophosphate, (2D) dibutyl phosphate (Internal Standard), (2E) 3,5,6-trichloro-2-pyridinol. Experimental conditions: HPLC-system, Agilent® 1100; MS-system, API 365 triple quadrupole with ESI, analysis in MRM mode; HPLC conditions, column dimension, 100×4 mm I.D.; mixed-modal RP/WAX selector immobilised onto silica (5 μm, 120 Å); flow rate, 1.00 mL.min$^{-1}$; temperature, 25° C.; injection, 15 μL; mobile phase, A: ACN/water=30/70 (v/v) containing 20 mM acetic acid, pH adjusted to 6.35 (with ammonia), B: ACN/Water=80/20 (v/v) containing 20 mM acetic acid, pH adjusted to 7.45 (with ammonia); gradient elution, linear gradient from 0 to 100% B in 10 min, then 100% B for 12 min, then 8 min re-equilibration with 0% B.

Figure 2:
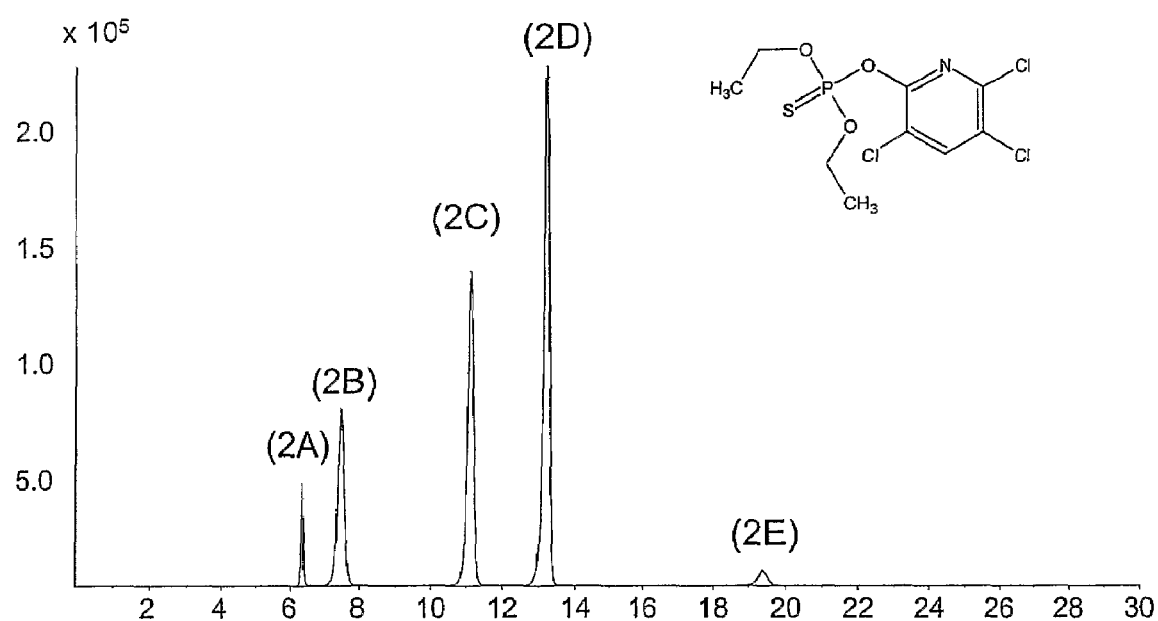
FIG. 2: Simultaneous separation of chlorpyrifos (2A) and its metabolites (2B, 2C, 2E) as well as an internal standard (2D) on mixed-modal RP/WAX based on N-undecenoyl-3-aminoquinuclidine (RP/WAX of example 1). (2B) Diethyl Phosphate, (2C) diethyl thiophosphate, (2D) dibutyl phosphate (Internal Standard), (2E) 3,5,6-trichloro-2-pyridinol. For experimental details see Example B2.

In conclusion, the new RP/WAX HPLC method with the newly invented mixed-modal bicyclic anion-exchanger greatly outperforms standard RP-HPLC on $C_{18}$ phases. The elution diagram is depicted in FIG. 2.

Example B3

Application of RP-WAX Based on N-(10-undecenoyl)-3-α-aminotropane for the Purification of a Synthetic Peptide The RP/WAX stationary phase of example A11 based on N-(10-undecenoyl)-3-α-aminotropane covalently immobilized on thiol-modified silica particles (5 μm, 120 Å pore diameter) by radical addition reaction, is tested for the separation and purification of a synthetic N- and C-protected tetrapeptide from its side products. The following chromatographic conditions are used: Stationary phase: RP/WAX material of example A11, 5 μm particles; column dimension, 150×4.0 mm I.D.; mobile phase, 1% (v/v) aqueous acetic acid (pH 4.5, adjusted with ammonia)-acetonitrile (80:20; v/v). Other conditions: flow rate, 1 ml/min; temperature, 25° C.; detection, TV 316 nm; peak description: (1) Unknown major peptide impurity, (2) N-acetyl-Ile-Glu-Gly-Arg-p-nitroanilide.

Figure 4:
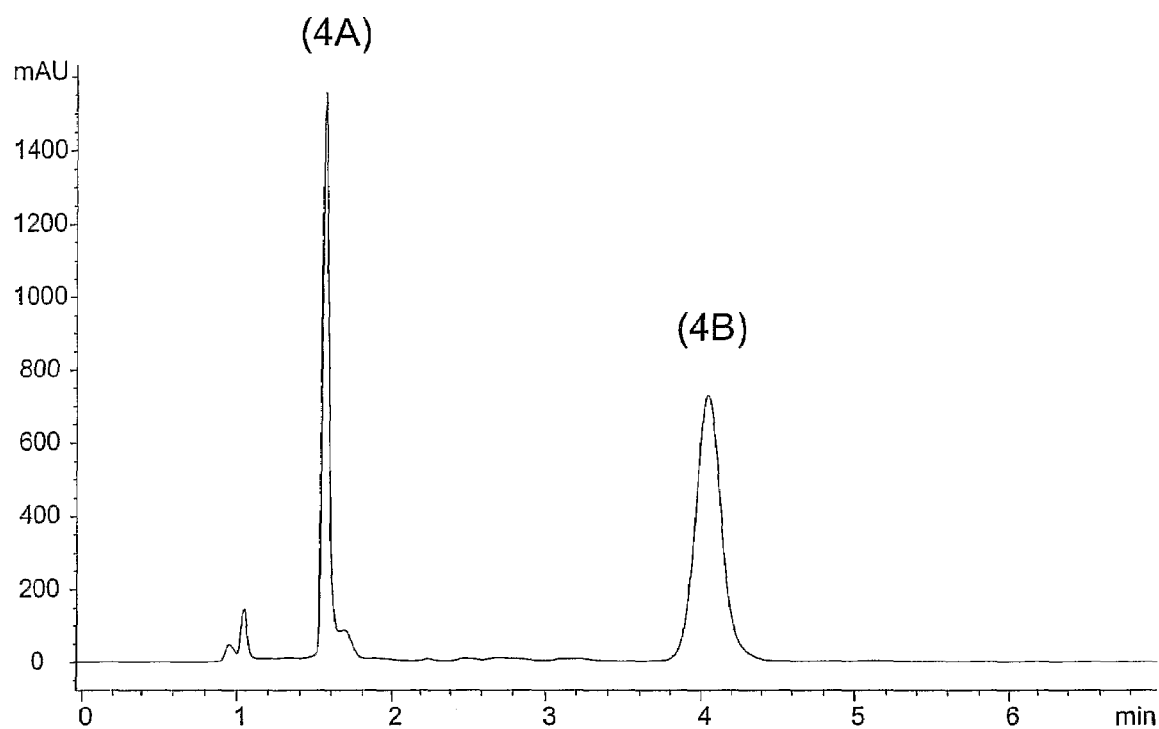
FIG. 4: Separation of N-acetyl-Ile-Glu-Gly-Arg-p-nitroanilide from its side products using a mixed-modal anion-exchange material based on 3-α-amino-tropane. For experimental details see Example B3.

The resulting chromatogram is shown in FIG. 4.

Experimental details: Separation of N-acetyl-Ile-Glu-Gly-Arg-p-nitroanilide from its side products using a mixed-modal anion-exchange material based on 3-α-aminotropane (material of example A11). Column dimension, 150×4.0 mm I.D.; mobile phase, 1% (v/v) aqueous acetic acid (pH 4.5, adjusted with ammonia)-acetonitrile (80:20; v/v). Other conditions: flow rate, 1 ml/min; temperature, 25° C.; detection, UV 316 nm; peak description: (4A) Unknown major peptide impurity, (4B) N-acetyl-Ile-Glu-Gly-Arg-p-nitroanilide.

Example B4

Figure 5:
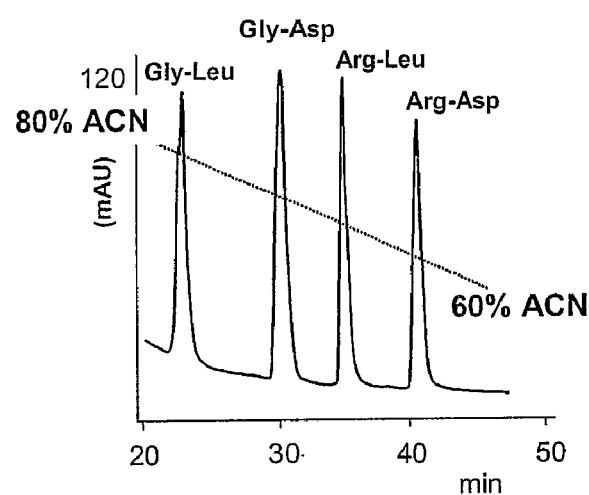
FIGS. 5 and 6: Comparison of peptide separations by HILIC/WAX (FIG. 5) and RP (FIG. 6) modes. For experimental details see Example B4.
Figure 6:
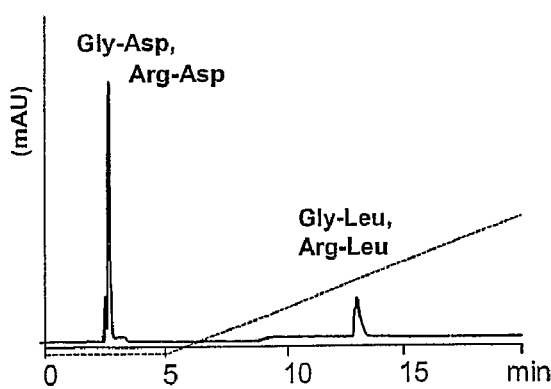

Application of Mixed-Mode Stationary Phase Based on N-(10-undecenoyl)-3-aminoquinuclidine in HILIC/WAX Mode Example B4 demonstrates the applicability and usefulness of the mixed-modal anion-exchange material of example A1 in the hydrophilic interaction chromatography (HILIC) mode. In the HILIC mode eluents with high proportions of organic modifier, in particular acetonitrile or methanol, are employed and polar interactions are the dominating forces for retention under these conditions. Elution of the polar analytes occurs due to the aqueous fraction in the eluent or upon increasing the water content of the eluent (decreasing organic modifier gradient or increasing water and buffer gradient, respectively). The analytes elute according to their increasing polarity, i.e. the more polar the solutes the stronger their retention. FIG. 5 shows the separation of the four peptides Gly-Leu, Gly-Asp, Arg-Leu, and Arg-Asp. Acetonitrile (ACN) is used as organic modifier and the separation is run in gradient elution mode with a decreasing linear gradient of acetonitrile. It is seen that the most lipophilic peptide Gly-Leu is eluted first, while the most hydrophilic peptide is eluted as last of the four solutes. On a RP system the elution order is different (see FIG. 6). This chromatographic behavior is typical for hydrophilic interaction chromatography and it can therefore be concluded that the present mixed-modal anion-exchange materials are useful for hydrophilic interaction chromatography, or more precisely speaking for mixed-modal HILIC/WAX chromatography.

Experimental details: Comparison of peptide separations by HILIC/WAX (FIG. 5) and RP (FIG. 6) modes. Stationary phases: (a) Material of example A1 (see also B1). (b) Beckman ODS (see example BI). Experimental conditions: (a) mobile phase, water (A), ACN (B), 200 mM phosphoric acid pH 3.0 (adjusted with triethylamine) (C); gradient, C constant at 5%, B constant at 90% from 0-5 min, then descending linear gradient from 90 to 50% B in 60 min; (b) mobile phase, water containing 0.1% trifluoroacetic acid (TFA) (A), ACN containing 0.1% TFA (B); gradient, B constant at 5% from 0-5 min, then ascending linear gradient from 5 to 90% B in 60 min. Other conditions identical: flow-rate 1 ml/min; temperature, 25° C.; detection wavelength, 215 nm.

Example B5

Application of Mixed-Mode Stationary Phase Based on N-(10-undecenoyl)-3-aminoquinuclidine in HIC/WAX Mode Example B5 illustrates the applicability of the material of example A1 to be used in mixed-modal hydrophobic interaction/anion-exchange (HIC/WAX) chromato-graphy mode.

hVIP, a peptide consisting of 28 amino acids with a molecular weight of 3325.8 and a pI of about 10, applied to chromatography in the RP/WAX mode. Under the experimental conditions (eluent pH 3) both peptide and stationary phase carry a net positive charge and repulsive electrostatic interactions occur. Therefore, the peptide ($t_R$=6.00 min) which is relatively hydrophobic elutes close to the void time or even earlier (to =7.38 min). Two additional major peaks are observed in the chromatogram at higher elution times which are believed to originate from micellar aggregates of hVIP. If the percentage of acetonitrile is increased to 3% and the triethylammonium phosphate (TEAP) buffer is reduced to a total concentration of 1 mM the aggregates are partly broken and these conditions also possess high elution strength so that hVIP ($t_R$=6.40 min) again elutes before the void time ($t_0$=9.03 min). Accordingly, both these chromatographic separation modes can be classified as RP/WAX mixed-mode chromatography.

In contrast, different separation conditions can be explained by a mixed-modal HIC/WAX mechanism. The increase of the TEAP buffer concentration in the eluent to 50 and 100 mM, respectively, results in a decrease of the actual potential of the anion exchange sites, which paves the way for hydrophobic interactions. The increased buffer concentration causes also a kind of salting out effect, which leads to strong adsorption of hVIP. The peptide does not elute as long as the buffer concentration is kept above ca. 25 mM. However, when a steep negative gradient of TEAP from 100 mM to 10 mM is run within 2 min, hVIP elutes as a sharp band once the total TEAP concentration reaches a level of about 10 nm. A similar behavior is found under similar conditions: A negative linear gradient from 100 mM TEAP to 0 mM is run in accordance to typical HIC experiments. Again hVIP elutes when the TEAP concentration drops below 20 mM. Both chromatograms clearly prove the existence of a HIC mechanism.

Example B6

Figure 7:
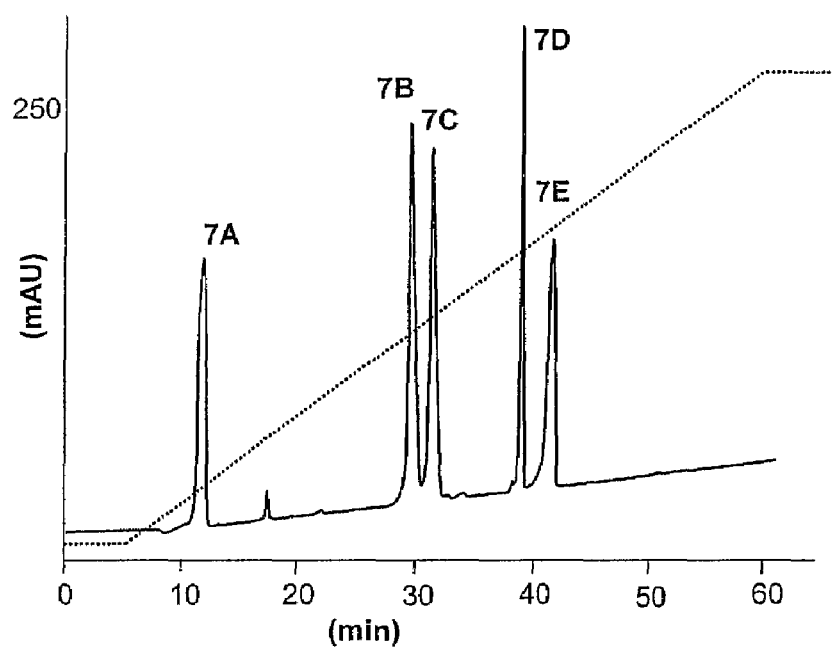
FIG. 7: Separation of acidic peptides on a RP/WAX silica monolith column. For experimental details see Example B6.

Application of Mixed-Modal RP-WAX Monolithic Silica Based on N-(10-undecenoyl)-3-aminoquinuclidine FIG. 7 shows the separation of acidic peptides differing in the number of acidic groups on a mixed-modal RP/WAX monolithic silica column based on an N-(10-undecenoyl)-3-aminoquinuclidine selector (material of example A3). The mixed-modal RP/WAX monolithic silica column gives a nice separation of the 5 peptides due to their charge differences (FIG. 7). This example shows that the effectiveness of the RP/WAX selectors is not restricted to particulate silica materials, but is available for other supports as well.

The chromatogram obtained for acidic peptides on RP/WAX silica monolith column of example A3. Experimental conditions: mobile phase, water (A), ACN (B), 200 mM phosphoric acid pH 3.0 (adjusted with triethylamine) (C); gradient, B constant at 10%, linear gradient from 0 to 30% C from 5-60 min; other conditions: flow-rate 1 ml/min; temperature, 25° C.; detection wavelength, 215 nm. Sample: (7A) Gly-Asp, (7B) Glu-Glu, (7C) Asp-Asp, (7D) Asp-Asp-Asp, (7E) Asp-Asp-Asp-Asp.

C Comparison Examples

Example C1

Comparison of RP/WAX Stationary Phase Analogs Based on Cyclic and Non-Cyclic Anion-Exchange Synthons The reaction scheme is outlined in Formula XIII, wherein the waved lines represent the support based on silica:

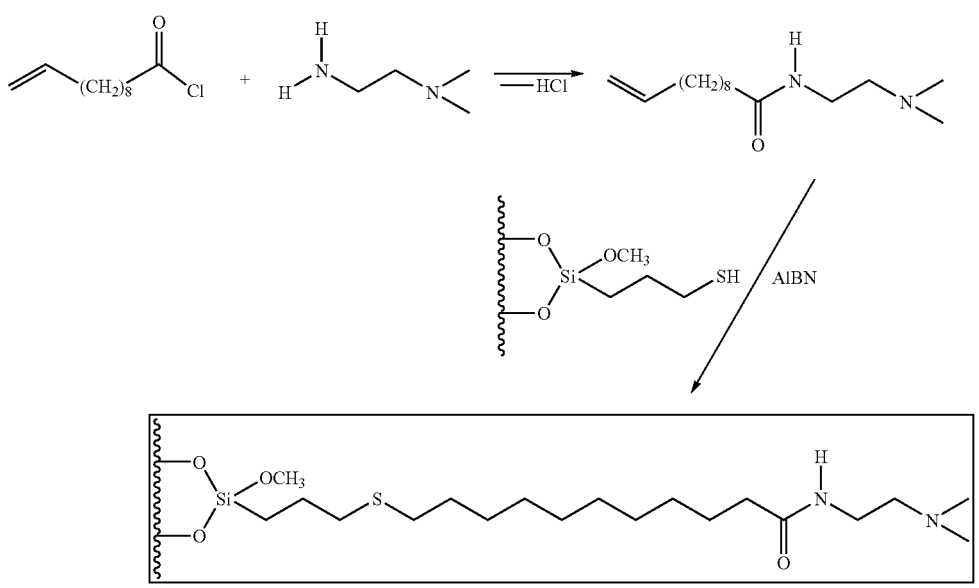

Formula XIII a) Synthesis of Ligand

2-Dimethylaminoethylamine (26 mmol) is dissolved in chloroform and to the stirred and cooled solution 10-undecenoic acid chloride (22 mmol in chloroform) is slowly added by dropwise addition. The reaction is allowed to proceed for 18 h at room temperature.

From the reaction mixture the N,N-dimethyl-N-10-undecenoyl-1,2-ethanediamine selector is extracted with aqueous 2M sodium hydroxide and chloroform (3×). The combined organic phases are dried with anhydrous sodium sulfate and then evaporated to dryness. After drying under vacuum an oily yellowish product is furnished in 94% yield.

ESI-MS (positive mode): 255.4 amu [M+H]$^+$. $^1$H NMR (400 MHz, CDCl$_3$): 6.11 (s, 1H), 5.80 (m, 1H), 4.96 (dd, 2H), 2.32 (q, 2H), 2.23 (s, 6H), 2.17 (t, 2H), 2.14 (t, 2H), 2.03 (q, 2H), 1.61 (t, 2H), 1.37 (t, 2H), 1.30 (s, 8H) ppm.

b) Immobilization of the RP/WAX Ligand on Thiol-Modified Silica

The immobilization of the N,N-dimethyl-N-10-undecenoyl-1,2-ethanediamine selector on 3-mercaptopropyl-modified silica (Kromasil® 100-5 μm; 4.02% C, 0.90% H, 0.03% N, 2.35% S) follows the protocol as described in example A1. The elemental analysis of the RP/WAX stationary phase before and after end-capping provides the following results: 11.57% C, 2.16% H, 1.36% N, 1.98% S (before end-capping) and 12.62% C, 2.21% H, 1.27% N, 1.86% S (after end-capping).

c) Comparative Chromatographic Evaluation of Cyclic and Non-Cyclic RP/WAX

Both the RP/WAX stationary phase based on the cyclic N-10-undecenoyl-3-aminoquinuclidine selector of example A1 and the RP/WAX stationary phase based on the non-cyclic N,N-dimethyl-N-10-undecenoyl-1,2-ethanediamine of example 10a are chromatographically tested using a synthetic N- and C-terminally protected tetrapeptide (N-acetyl-Ile-Glu-Gly-Arg-p-nitroanilide), which contains an unknown impurity that is difficult to separate from the target peptide by gradient RP-HPLC. For the HPLC separations a sorbent according to the present invention (cyclic N-10-undecenoyl-3-aminoquinuclidine based (example A1); (a)) was compared to a non-cyclic RP-WAX sorbent (non-cyclic N,N-dimethyl-N-10-undecenoyl-1,2-ethanediamine (see steps a) and b) above); (b)). The other experimental conditions are as follows: Column dimensions, 250×4 mm ID; mobile phase, 1 M ammonium formate pH 4.5-water-acetonitrile (1.8:88.2:10; v/v/v) ($C_{tot}$=18 mM); flow-rate, 1 ml/min; temperature, 25° C.; detection wavelength, 316 nm.

Figure 3:
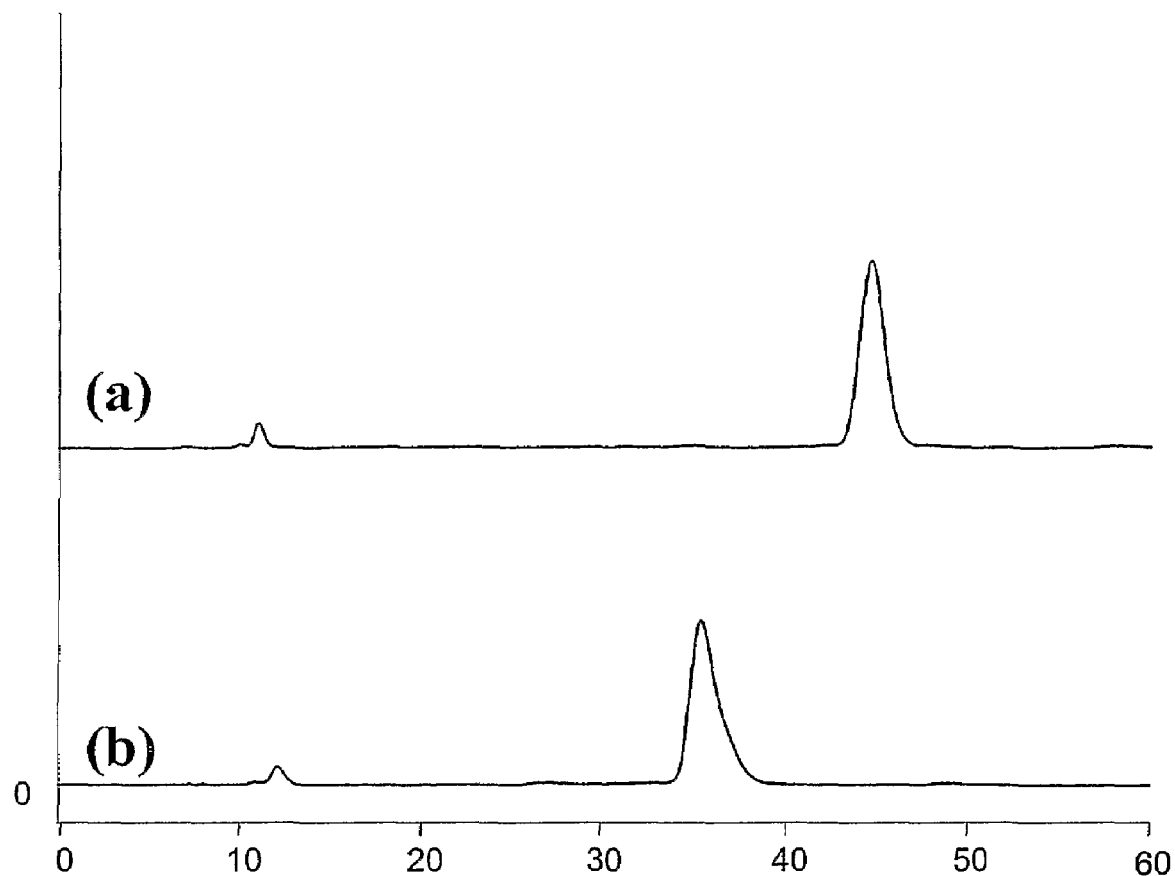
FIG. 3: HPLC separations of N-acetyl-Ile-Glu-Gly-Arg-p-nitroanilide and by-products from its synthesis on (a) N-10-undecenoyl-3-aminoquinuclidine based (example A1) and (b) non-cyclic N,N-dimethyl-N-10-undecenoyl-1,2-ethanediamine based RP/WAX stationary phases. For experimental details see Example C1.

It can be seen from the chromatograms in FIG. 3 that the RP/WAX phase based on the cyclic tertiary amine surprisingly exhibits much higher separation capabilities than its analog based on the non-cyclic tertiary amine. The separation factor is 5.2 on the cyclic RP/WAX phase (FIG. 3a), while it is only 3.5 on the non-cyclic analog (FIG. 3b). This dramatic loss of selectivity is mainly responsible for the drop of resolution from 32 on the cyclic RP/WAX to only 19 on the noon-cyclic one. The significantly higher resolution on the cyclic RP/WAX also translates into a much better sample loading capacity and hence productivity in comparison to the non-cyclic analog when it is used for the chromatographic purification of the synthetic target peptide from its impurity.

Thus the RP/WAX stationary phase according to the present invention displays surprisingly a higher selectivity compared to its non-cyclic analogue of prior art.

Similar findings were observed for other test solutes.

Example C2

Comparison Experiments Using a RP/WAX Stationary Phase With an Anion-Exchange Moiety Based on the DABCO-Synthon The reaction scheme is outlined in Formula XVI, wherein the waved lines represent the support based on silica:

Formula XVI

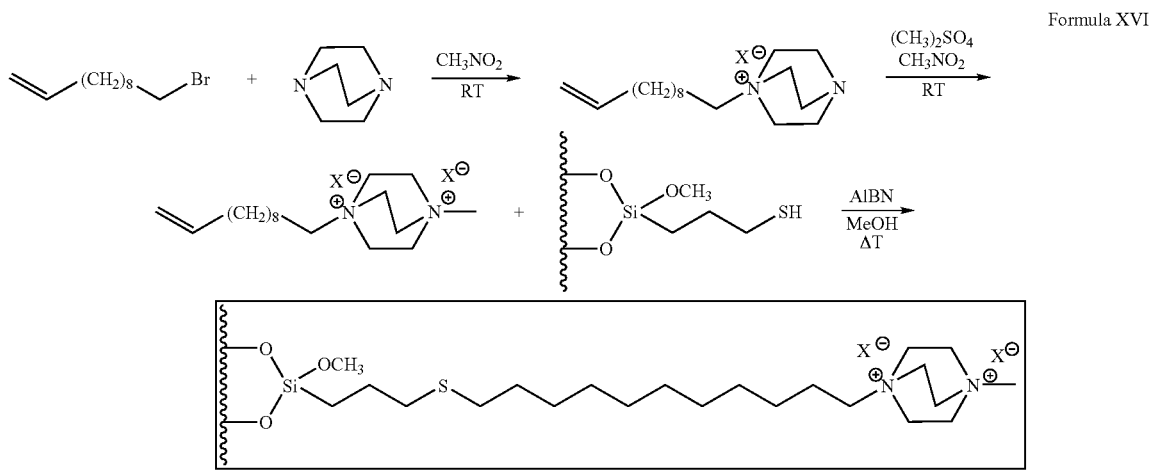

a) Synthesis of the Bis-Quaternary DABCO-Based Anion-Exchange Selector

Formula XVII

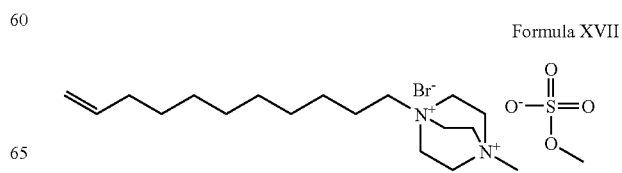

To a well stirred solution of 1,4-diazabicyclo[2.2.2]octane (DABCO) (1 equivalent) in nitromethane (0.5 n7 L per mmol amine) 11-bromo-1-undecene (0.98 equivalents) is added keeping the reaction flask in a water bath at ~25° C. Stirring is continued for 16 h and thereafter the volatile fraction of the reaction mixture is evaporated. Crystallisation of the residual oil is obtained after stirring with petrol ether (intermediate product: 10-undecen-1-yl-4-aza-1-azoniabicyclo[2.2.2]octane bromide; yield 87%). After drying in vacuum for 12 h, this intermediate product (1 equivalent) is stirred with dimethyl sulfate (2 equivalents) in nitromethane (0.25 mL per mmol dimethyl sulfate) at 25° C. for 16 h. The volatile fraction is removed by evaporation. Stirring of the residual crude product with petrol ether affords a white solid which is dried in vacuum; yield 82%.

Characterisation

10-Undecen-1-yl-4-aza-1-azoinabicyclo[2.2.2]octane bromide (Intermediate Product)

$^1$H-NMR (400 MHz, MeOD): 5.80 (m, 1H), 4.97 (dd, 1H), 4.91 (dd, 1H), 3.37 (m, 6H), 3.21 (m, 8H), 2.05 (q, 2H), 1.82-1.71 (m, 2H), 1.45-1.30 (m, 12H) ppm.

Bis-Quaternary DAB CO-Based Selector $^1$H-NMR (400 MHz, MeOD): 5.80 (m, 1H), 4.97 (dd, 1H), 4.91 (dd, 1H), 4.00 (m, 12H), 3.55 (m, 2H), 3.37 (s, 3H), 2.04 (m, 2H), 1.89-1.78 (m, 2H), 1.47-1.29 (m, 12H) ppm.

b) Immobilization of the Bis-Quaternary-DABCO-Based Selector on Thiol-Modified Silica The bis-quaternary DABCO-based selector of example C2, step a) is immobilized on the same thiol-modified silica following the procedure as described in example A11, b).

The modified silica gel is washed several times with methanol and dried for 72 hours. The elemental analysis of the chemically-modified particles before end-capping provides the following results: 11.27% C, 2.25% H, 0.94% N and 4.29% S.

Remaining thiol-groups are capped by radical addition of 1-hexene (3.2 ml) under otherwise identical conditions as described above for the selector addition. The gel is washed with methanol, 3% acetic acid in methanol, and diethylether, dried for 72 hours, and packed into stainless-steel HPLC columns.

Figure 8:
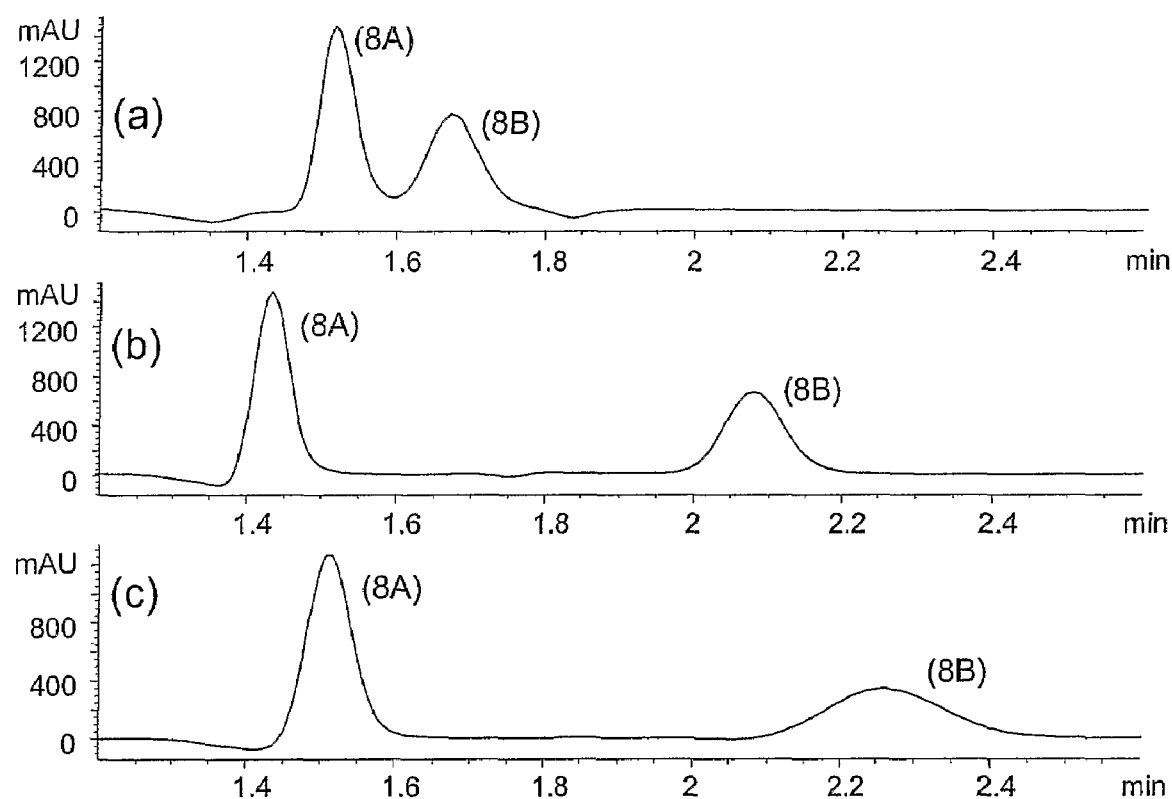
FIGS. 8, 9, 10 and 11: Comparison of separations by RP/WAX materials according to the present invention and materials of prior art based on the DABCO synthon. For experimental details see Example C2.

The elemental analysis of the RP/SAX stationary phase after end-capping provides the following results: 11.80% C, 2.33% H, 0.88% N and 4.01% S.

c) Comparative Chromatographic Evaluation of Anion-Exchange Stationary Phases Based on the DABCO Synthon and Phases According to the Present Invention The DABCO-based material of above is evaluated regarding its adsorption capacity for the tetrapeptide N-acetyl-Ile-Glu-Gly-Arg-p-nitroanilide in comparison to the RP/WAX materials of the present invention, namely the mixed-modal anion exchange material of example A11 based on N-(10-undecenoyl)-3-α-aminotropane and of example A1 based on N-(10-undecenoyl)-3-aminoquinuclidine. The following chromatographic conditions are used: Column dimensions, 150×4.0 mm I.D.; mobile phase, 1% (v/v) aqueous acetic acid (pH 4.5, adjusted with ammonia)-acetonitrile (70:30; v/v). Other conditions: flow rate, 1 ml/min; temperature, 25° C.; detection, UV 230 nm; peak description: (8A) uracil, (8B) N-acetyl-Ile-Glu-Gly-Arg-p-nitroanilide. The resulting chromatograms are shown in FIG. 8.

Figure 9:
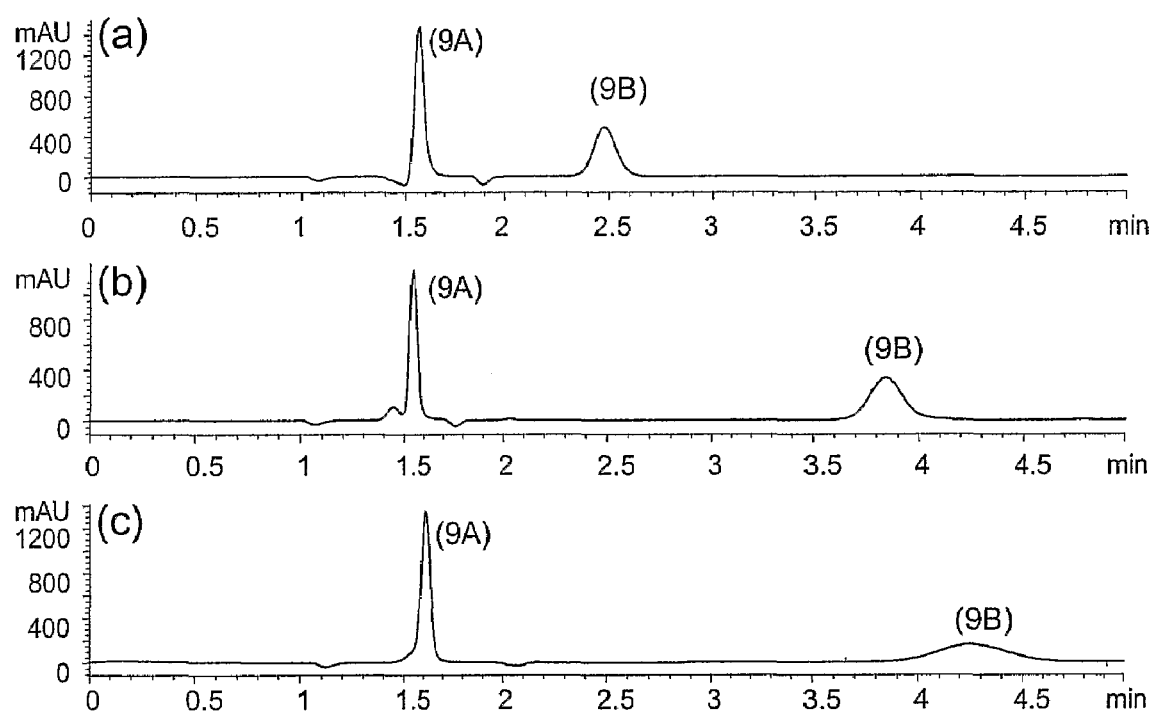

Experimental conditions: Chromatograms obtained for the separation of N-acetyl-Ile-Glu-Gly-Arg-p-nitroanilide from uracil using (a) an anion-exchange material of prior art based on bis-quaternary DABCO (material described above based on 5 μm particles) and (b,c) mixed-modal RP/WAX materials according to the present invention based on (b) N-(10-undecenoyl)-3-α-aminotropane selector (material of example A11 based on 5 μm particles) and (c) N-(10-undecenoyl)-3-aminoquinuclidine (material of example A1 based on 10 μm particles). Column dimensions, 150×4.0 nm I.D.; mobile phase, 1% (v/v) aqueous acetic acid (pH 4.5, adjusted with ammonia)-acetonitrile (70:30; v/v). Other conditions: flow rate, 1 ml/min; temperature, 25° C.; detection, UV 230 nm; peak description: (8A) uracil, (8B) N-acetyl-Ile-Glu-Gly-Arg-p-nitroanilide. The resulting chromatograms are shown in FIG. 8.

d) Comparative Chromatographic Evaluation of Anion-Exchange Stationary Phases Based on Mono-Cationic (3-Aminoquinuclidine and 3-α-aminotropane) and bis-cationic (bis-quaternary DABCO) Synthons The DABCO-based material of above is evaluated regarding its adsorption capacity for the tetrapeptide N-acetyl-Ile-Glu-Gly-Arg-p-nitroanilide in comparison to the RP/WAX materials of the present invention, namely the mixed-modal anion exchange material of example A11 based on N-(10-undecenoyl)-3-α aminotropane and of example A1 based on N-(10-undecenoyl)-3-aminoquinuclidine. Chromatograms obtained for the separation of N-acetyl-Ile-Glu-Gly-Arg-p-nitroanilide from uracil using (a) an anion-exchange material of prior art based on bis-quaternary DABCO (material described above based on 5 μm particles) and (b,c) mixed-modal RP/WAX materials according to the present invention based on (b) N-(10-undecenoyl)-3-α-aminotropane selector (material of example A11 based on 5 μm particles) and (c) N-(10-undecenoyl)-3-aminoquinuclidine (material of example A1 based on 10 μm particles). Column dimensions, 150×4.0 mm I.D.; mobile phase, 1% (v/v) aqueous acetic acid (pH 4.5, adjusted with ammonia)-acetonitrile (80:20; v/v). Other conditions: flow rate, 1 ml/min; temperature, 25° C.; detection, UV 230 nm; peak description: (1) uracil, (2) N-acetyl-Ile-Glu-Gly-Arg-p-nitroanilide.-aminotropane and of example A1 based on N-(10-undecenoyl)-3-aminoquinuclidine. The following chromatographic conditions are used: Column dimensions, 150×4.0 mm I.D.; mobile phase, 1% (v/v) aqueous acetic acid (pH 4.5, adjusted with ammonia)-acetonitrile (80:20; v/v). Other conditions: flow rate, 1 ml/min; temperature, 25° C.; detection, UV 230 nm; peak description: (9A) uracil, (9B) N-acetyl-Ile-Glu-Gly-Arg-p-nitroanilide. The resulting chromatograms are shown in FIG. 9.

Figure 10:
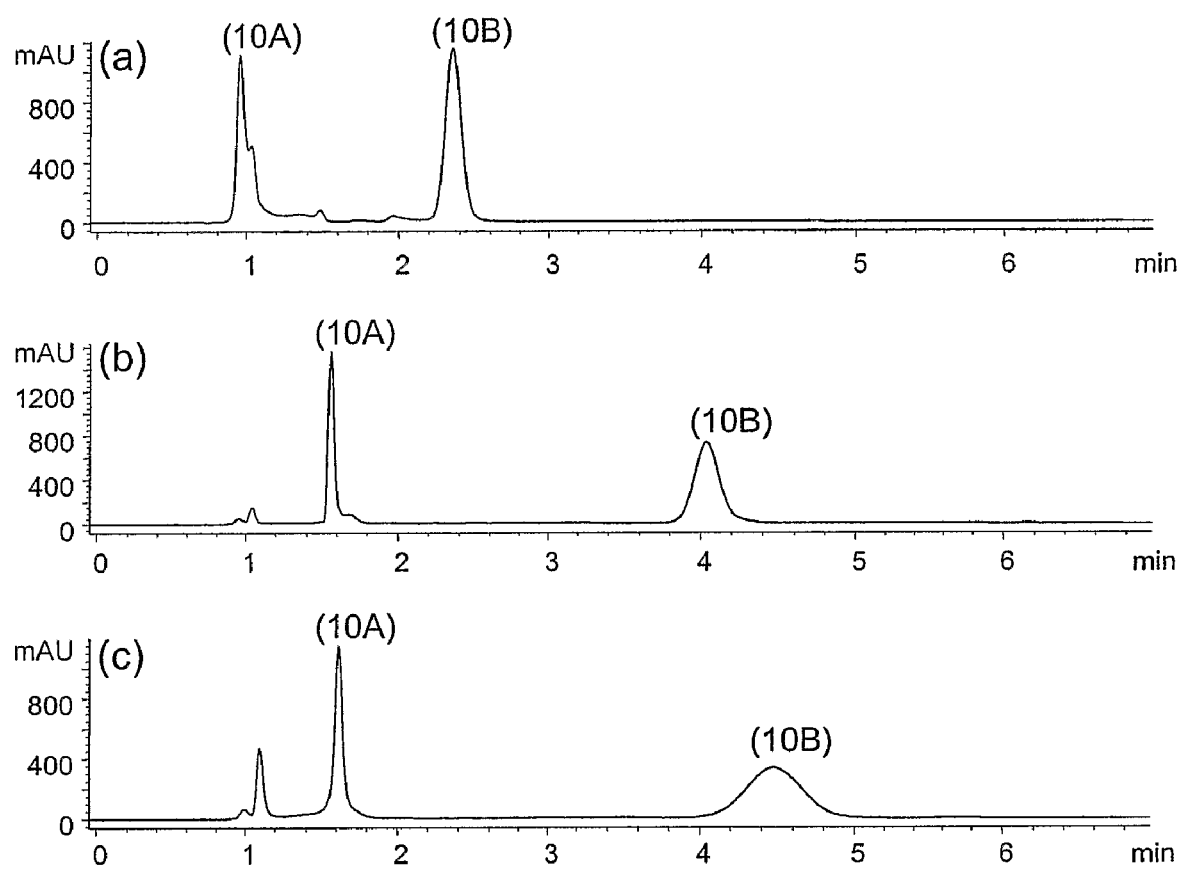

Experimental details: Chromatograms obtained for the separation of N-acetyl-Ile-Glu-Gly-Arg-p-nitroanilide from uracil using (a) an anion-exchange material of prior art based on bis-quaternary DABCO (material described above based on 5 μm particles) and (b,c) mixed-modal RP/WAX materials according to the present invention based on (b) N-(10-undecenoyl)-3-α-aminotropane selector (material of example A11 based on 5 μm particles) and (c) N-(10-undecenoyl)-3-aminoquinuclidine (material of example A1 based on 10 μm particles). Column dimensions, 150×4.0 nm n I.D.; mobile phase, 1% (v/v) aqueous acetic acid (pH 4.5, adjusted with ammonia)-acetonitrile (80:20; v/v). Other conditions: flow rate, 1 ml/min; temperature, 25° C.; detection, UV 230 nm; peak description: (9A) uracil, (9B) N-acetyl-Ile-Glu-Gly-Arg-p-nitroanilide.

e) Comparative Chromatographic Evaluation of Anion-Exchange Stationary Phases Based on Mono-Cationic (3-aminoquinuclidine and 3-α-aminotropane) and bis-cationic (bis-quaternary DABCO) Synthons The DABCO-based material of above (i.e. the material of closest prior art) is evaluated regarding its adsorption capacity for the tetrapeptide N-acetyl-Ile-Glu-Gly-Arg-p-nitroanilide in comparison to the RP/WAX materials of the present invention, namely the mixed-modal anion exchange material of example A11 based on N-(10-undecenoyl)-3-α-aminotropane and of example A1 based on N-(10-undecenoyl)-3-aminoquinuclidine. The following chromatographic conditions are used: Column dimensions, 150×4.0 mm I.D.; mobile phase, 1% (v/v) aqueous acetic acid (pH 4.5, adjusted with ammonia)-acetonitrile (80:20; v/v). Other conditions: flow rate, 1 ml/min; temperature, 25° C.; detection, UV 316 nm; peak description: (10A) Unknown major peptide impurity, (10B) N-acetyl-Ile-Glu-Gly-Arg-p-nitroanilide. The resulting chromatograms are shown in FIG. 10.

Figure 11:
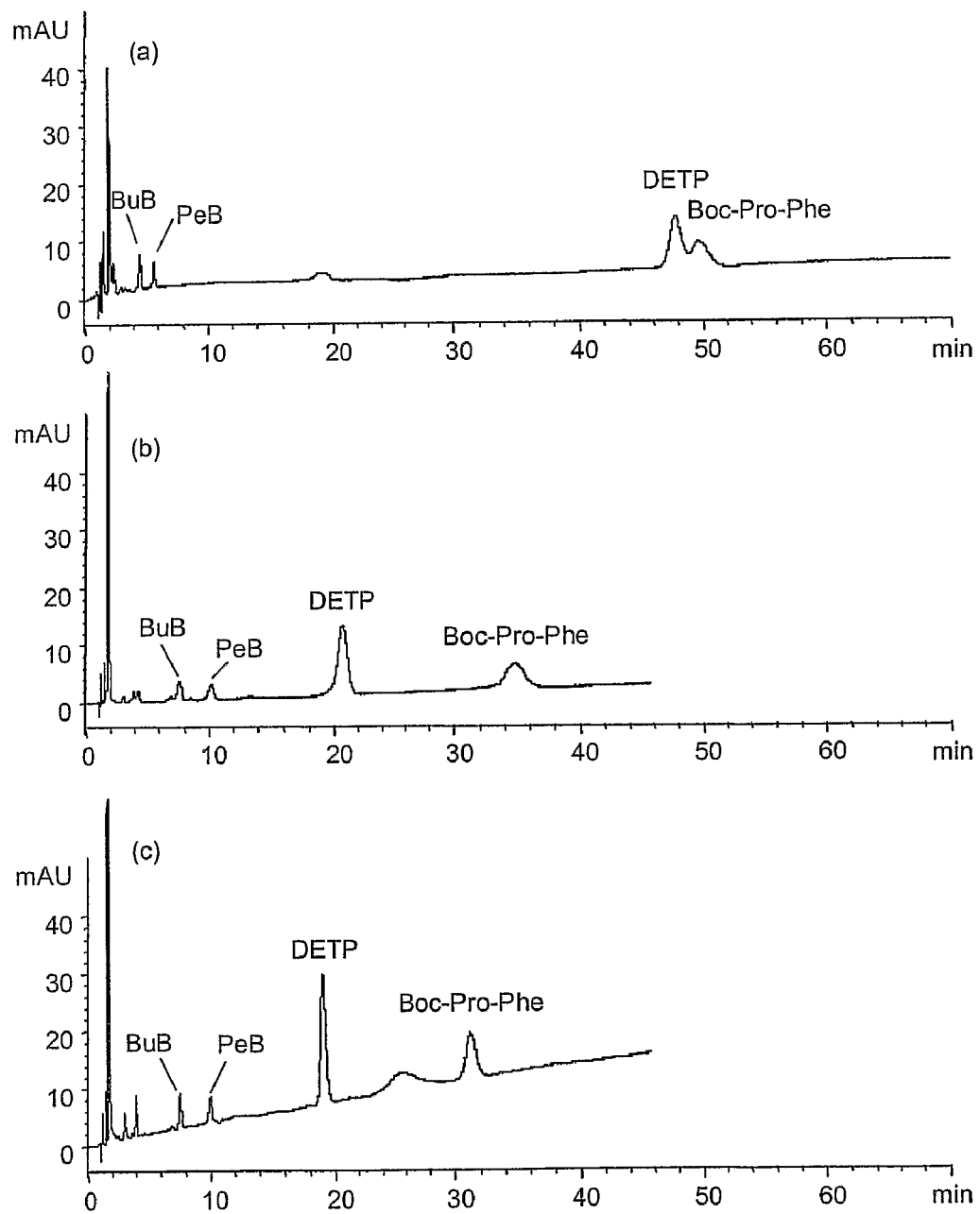

Experimental details: Separation of N-acetyl-Ile-Glu-Gly-Arg-p-nitroanilide from its side products using (a) an anion-exchange material of closest prior art based on bis-quaternary DABCO (material described above based on 5 μm particles) and (b,c) mixed-modal RP/WAX materials according to the present invention based on (b) N-(10-undecenoyl)-3-α-aminotropane selector (material of example A11 based on 5 μm particles) and (c) N-(10-undecenoyl)-3-aminoquinuclidine (material of example A1 based on 10 μm particles). Column dimensions, 150×4.0 mm I.D.; mobile phase, 1% (v/v) aqueous acetic acid (pH 4.5, adjusted with ammonia)-acetonitrile (80:20; v/v). Other conditions: flow rate, 1 ml/min; temperature, 25° C.; detection, UV 316 nm; peak description: (10A) Unknown major peptide impurity, (10B) N-acetyl-Ile-Glu-Gly-Arg-p-nitroanilide.

f) Comparative Chromatographic Evaluation of Anion-Exchange Stationary Phases Based on Mono-Cationic (3-Aminoquinuclidine and 3-α-aminotropane) and bis-cationic (bis-quaternary DABCO) synthons The DABCO-based material of above (i.e. the material of prior art) is evaluated regarding its separation power for a test mixture consisting of butylbenzene, pentylbenzene, O,O-diethylphosphorothioate, and N-(tert-butoxycarbonyl)-prolyl-phenylalanine in comparison to the RP/WAX materials of the present invention, namely the mixed-modal anion exchange material of example A11 based on N-(10-undecenoyl)-3-α-aminotropane and of example A1 based on N-(10-undecenoyl)-3-aminoquinuclidine. The following chromatographic conditions are used: Column dimensions, 150×4.0 mm I.D.; mobile phase, 50 mM acetic acid in a mixture of acetonitrile-water (40:60; v/v), pH 6.0 (ammonia). Other conditions: flow rate, 1 ml/min; temperature, 25° C.; detection, UV 250 nm. The resulting chromatograms are shown in FIG. 11.

Experimental details: Separation of a mixture consisting of butylbenzene (BuB), pentylbenzene (PeB), O,O-diethylphosphorothioate (DETP), and N-(tert-butoxycarbonyl)-prolyl-phenylalanine (Boc-Pro-Phe) using (a) an anion-exchange material of prior art based on bis-quaternary DABCO (material described above based on 5 μm particles) and (b,c) mixed-modal RP/WAX materials according to the present invention based on (b) N-(10-undecenoyl)-3-α-aminotropane selector (material of example A11 based on 5 μm particles) and (c) N-(10-undecenoyl)-3-aminoquinuclidine (material of example A1 based on 10 μm particles). Column dimensions, 150×4.0 mm I.D.; mobile phase, 50 mM acetic acid in a mixture of acetonitrile-water (40:60; v/v), pH 6.0 (ammonia). Other conditions: flow rate, 1 ml/min; temperature, 25° C.; detection, UV 250 nm.

The invention claimed is:

1. A mixed-modal anion-exchange material comprising:
   a support
   and
   an interactive ligand moiety comprising,
   a sequential combination of modular binding domains which comprise at least one anion-exchange site which is ionizable under the conditions of use and at least one non-ionic binding site, wherein said anion exchange site comprises an oligocyclic aza compound with an endocyclic nitrogen,
   with the proviso that said oligocyclic aza compound bound to said support is not part of a cinchona alkaloid and is not a derivative of 1,4-diazabicyclo[2.2.2]octane (DABCO).

2. The mixed-modal anion-exchange material according to claim 1 wherein said anion-exchange site comprises an oligocyclic mono aza compound with endocyclic nitrogen.

3. The mixed-modal anion-exchange material according to claim 1, in which the anion-exchange site comprises a quinuclidine ring system.

4. The mixed-modal anion-exchange material according to claim 1, wherein the non-ionic binding site comprises a polar group containing amide, sulfonamide, urea, carbamate, thioether, sulfoxide, sulfone, and/or ether functions such that a mixed-modal hydrophilic interaction chromatography/anion-exchange material is obtained.

5. The mixed-modal anion-exchange material according to claim 1, wherein the non-ionic binding module comprises a long hydrophobic alkyl chain with 4 to 30 carbon atoms, whereby one or more non-adjacent (—CH2-)-groups can be replaced by sulfur (—S—), such that a mixed-modal reversed-phase/anion-exchange material is obtained.

6. The mixed-modal anion-exchange material according to claim 1, wherein the non-ionic binding module comprises a short alkyl chain with 1 to 4 carbon atoms or a phenyl or benzyl residue such that a mixed-modal hydrophobic interaction chromatography/anion-exchange material is obtained.

7. A method for separating at least two solutes comprising subjecting at least two solutes to a mixed-modal anion-exchange material according to claim 1.

8. The mixed-modal anion-exchange material according to claim 1, wherein said oligocyclic aza compound with an endocyclic nitrogen is:

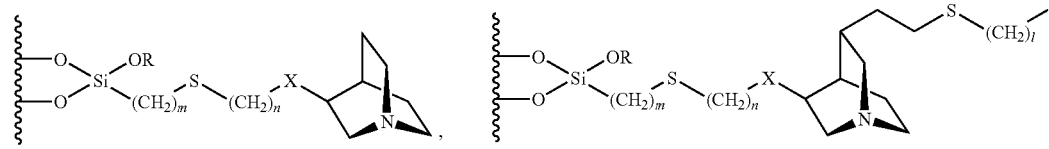

-continued
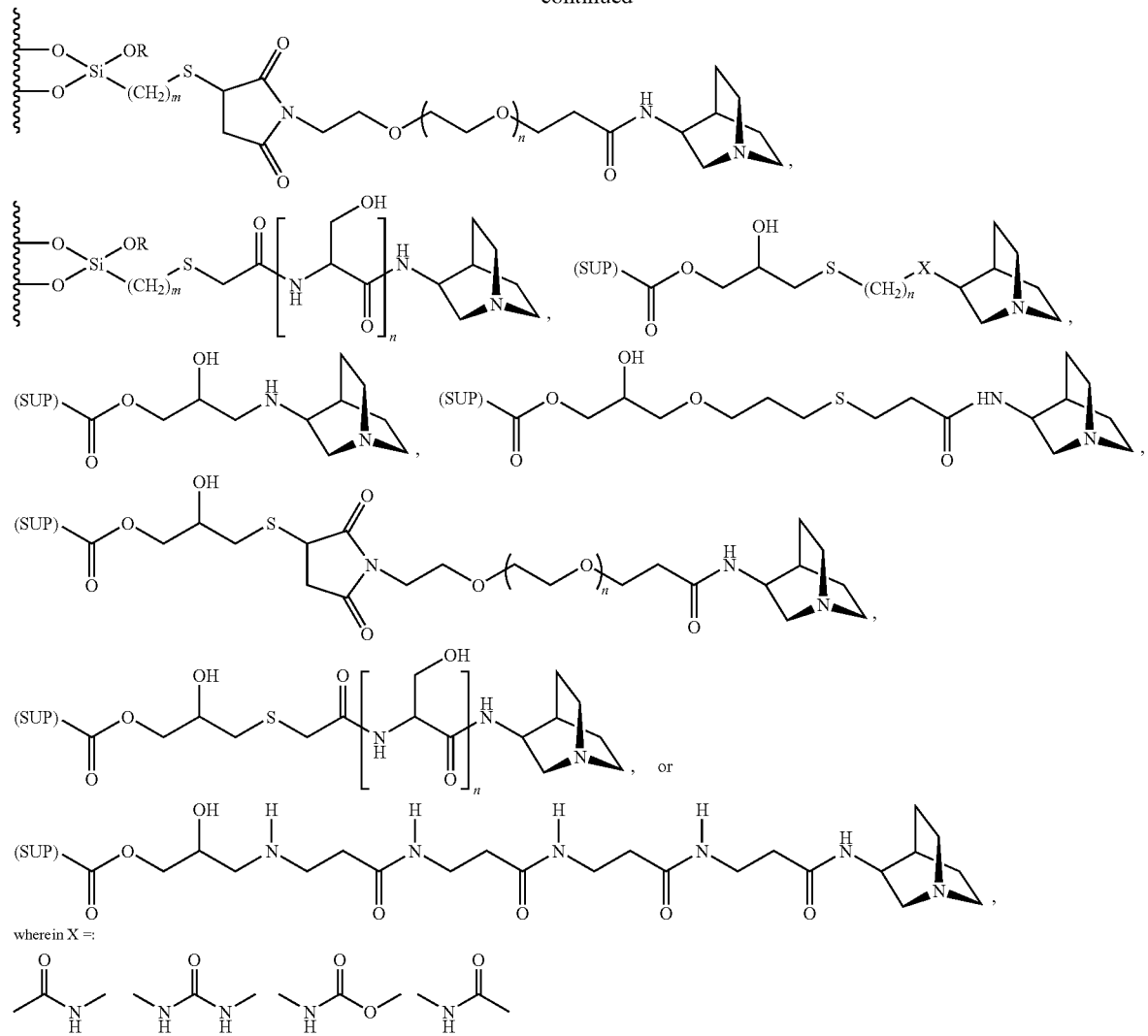
wherein X =:
m = 3
1 < n < 100
3 < l < 17.
* * * * *